US010869226B2

(12) United States Patent
Nakagawa

(10) Patent No.: US 10,869,226 B2
(45) Date of Patent: Dec. 15, 2020

(54) WIRELESS COMMUNICATION APPARATUS, WIRELESS COMMUNICATION SYSTEM AND WIRELESS COMMUNICATION METHOD

(71) Applicant: NEC Corporation, Minato-ku, Tokyo (JP)

(72) Inventor: Koichi Nakagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 13 days.

(21) Appl. No.: 15/769,777

(22) PCT Filed: Sep. 9, 2016

(86) PCT No.: PCT/JP2016/004111
§ 371 (c)(1),
(2) Date: Apr. 20, 2018

(87) PCT Pub. No.: WO2017/068746
PCT Pub. Date: Apr. 27, 2017

(65) Prior Publication Data
US 2018/0234884 A1      Aug. 16, 2018

(30) Foreign Application Priority Data

Oct. 23, 2015   (JP) ................................. 2015-208756

(51) Int. Cl.
*H04W 28/08*       (2009.01)
*H04W 24/08*       (2009.01)
*H04W 28/02*       (2009.01)

(52) U.S. Cl.
CPC ......... *H04W 28/085* (2013.01); *H04W 24/08* (2013.01); *H04W 28/0252* (2013.01)

(58) Field of Classification Search
CPC ............... H04W 28/085; H04W 24/08; H04W 28/0252
(Continued)

(56) References Cited

U.S. PATENT DOCUMENTS 5,862,487 A * 1/1999 Fujii ..................... H04W 16/14
                                                          455/454
9,325,597 B1 * 4/2016 Clasen ................ H04L 43/0882
(Continued)

FOREIGN PATENT DOCUMENTS

JP       2007-180891 A    7/2007
JP       2008-153939 A    7/2008
(Continued)

OTHER PUBLICATIONS

International Search Report for PCT Application No. PCT/JP2016/004111, dated Nov. 15, 2016.

*Primary Examiner* — Jae Y Lee
*Assistant Examiner* — Jean F Voltaire

(57) ABSTRACT

A wireless communication apparatus, a wireless communication system and a wireless communication method which can effectively use surplus radio bands of a first link configured by bundling a plurality of radio links are provided. The wireless communication apparatus (1) includes a flow rate monitoring unit (2) and a detecting unit (4). The flow rate monitoring unit (2) monitors a traffic flow rate of the virtual circuit. The detecting unit (4) compares the monitored traffic flow rate with radio bands of the virtual circuit, and detects a surplus of radio bands of the virtual circuit relative to the traffic flow rate.

11 Claims, 18 Drawing Sheets

(58) Field of Classification Search
USPC .......................................................... 370/235
See application file for complete search history.

(56) References Cited

U.S. PATENT DOCUMENTS

| | | | | |
|---|---|---|---|---|
| 2010/0254409 A1* | 10/2010 | Lu | .......................... | H04L 45/125 |
| | | | | 370/477 |
| 2011/0110248 A1* | 5/2011 | Koitabashi | .............. | H04L 45/00 |
| | | | | 370/252 |
| 2012/0120829 A1* | 5/2012 | Blankenship | ........... | H04L 5/001 |
| | | | | 370/252 |
| 2013/0028128 A1* | 1/2013 | Novak | ...................... | H04L 1/00 |
| | | | | 370/252 |

FOREIGN PATENT DOCUMENTS

| | | | |
|---|---|---|---|
| JP | 2011-103614 | A | 5/2011 |
| JP | 2014-192666 | A | 10/2014 |
| JP | 2015-056836 | A | 3/2015 |
| WO | 2014/174768 | A1 | 10/2014 |

* cited by examiner

WIRELESS COMMUNICATION APPARATUS, WIRELESS COMMUNICATION SYSTEM AND WIRELESS COMMUNICATION METHOD

This application is a National Stage Entry of PCT/JP2016/004111 filed on Sep. 9, 2016, which claims priority from Japanese Patent Application 2015-208756 filed on Oct. 23, 2015, the contents of all of which are incorporated herein by reference, in their entirety.

TECHNICAL FIELD

The present invention relates to a wireless communication apparatus, a wireless communication system and a wireless communication method.

BACKGROUND ART

In a packet transmission network, a network which uses radio links has a small capacity for transmission only via one radio link. Therefore, a plurality of radio links are bundled as a one virtual circuit to expand a transmission capacity. That is, a single traffic is distributed to a plurality of radio links to secure the transmission capacity for all the radio links. By this means, it is possible to transmit a large volume of traffic. Transmitting a traffic via a virtual circuit that is a virtual link configured by virtually bundling a plurality of radio links is referred to as traffic bonding or link aggregation.

With regard to the above technique, for example, Patent Literature 1 discloses a wireless communication apparatus which can transmit data by the link aggregation via a plurality of radio links.

Further, Patent Literature 2 discloses a packet transfer apparatus which uses a logical port configured by logically bundling physical ports connected with a plurality of physical circuits similar to the link aggregation. The packet transfer apparatus according to Patent Literature 2 reassigns a traffic when the traffic becomes uneven per physical port in the logical port, and corrects the unevenness.

Further, Patent Literature 3 discloses a communication apparatus which can level traffic of each of a plurality of physical ports configuring the link aggregation. The communication apparatus according to Patent Literature 3 includes monitoring means for monitoring a traffic flow rate of each of a plurality of physical ports, deciding means for deciding whether or not the traffic flow rate of a transmission physical port exceeds a preset allowable threshold based on the monitoring result, and detecting whether or not there is a physical port which cannot transmit a received packet, and controlling means for bypassing packets to a physical port of a low traffic flow rate obtained based on the monitoring result when it is decided that the traffic flow rate of the transmission physical port exceeds the allowable threshold.

CITATION LIST

Patent Literature

Patent Literature 1: International Publication No. 2014/174768
Patent Literature 2: Japanese Unexamined Patent Application Publication No. 2011-103614
Patent Literature 3: Japanese Unexamined Patent Application Publication No. 2007-180891

SUMMARY OF INVENTION

Technical Problem

The traffic bonding expands a transmission capacity. Therefore, when the traffic flow rate is low, there is likely to be a surplus of radio bands of radio links according to the traffic bonding. In this case, not all radio bands of radio links according to the traffic bonding are used. Therefore, effective use of the surplus radio bands (surplus bands) is desired. The effective use of the surplus bands requires detection of surplus bands of a virtual circuit which is a virtual link configured by bundling a plurality of radio links configuring the traffic bonding.

On the other hand, the above Patent Literatures do not disclose detecting a surplus band of a virtual circuit. Patent Literature 2 and Patent Literature 3 disclose techniques of correcting unevenness in traffic in a plurality of links configuring the link aggregation, and leveling the traffic. However, Patent Literature 2 and Patent Literature 3 do not disclose a method for detecting surplus bands of a virtual circuit configured by bundling a plurality of links configuring the link aggregation. Therefore, the techniques according to the above Patent Literatures have difficulty in effectively using surplus bands even when the traffic bonding produces the surplus bands.

The present invention has been made to solve such a problem. The present invention provides a wireless communication apparatus, a wireless communication system and a wireless communication method which can effectively use surplus radio bands of a first link configured by bundling a plurality of radio links.

Solution to Problem

A wireless communication apparatus according to the present invention includes: flow rate monitoring means for monitoring a traffic flow rate of a first link configured by virtually bundling a plurality of radio links; and detecting means for comparing the monitored traffic flow rate with a radio band of the first link, and detecting a surplus of radio bands of the first link relative to the traffic flow rate.

A wireless communication system according to the present invention includes: a first wireless communication apparatus; a second wireless communication apparatus that receives data from the first wireless communication apparatus via a plurality of radio links, in which the first wireless communication apparatus includes: flow rate monitoring means for monitoring a traffic flow rate of a first link configured by virtually bundling a plurality of radio links, and detecting means for comparing the monitored traffic flow rate with a radio band of the first link, and detecting a surplus of radio bands of the first link relative to the traffic flow rate.

A wireless communication method according to the present invention includes: monitoring a traffic flow rate of a first link configured by virtually bundling a plurality of radio links; and comparing the monitored traffic flow rate with a radio band of the first link, and detecting a surplus of radio bands of the first link relative to the traffic flow rate.

Advantageous Effects of Invention

The present invention can provide a wireless communication apparatus, a wireless communication system and a wireless communication method which can effectively use a surplus radio band of a first link configured by bundling a plurality of radio links.

DESCRIPTION OF EMBODIMENTS (Outline of Exemplary Embodiments of Present Invention)

Prior to giving a description of the exemplary embodiments, an outline of the exemplary embodiments of the present invention will be described with reference to FIG. 1.

Figure 1:
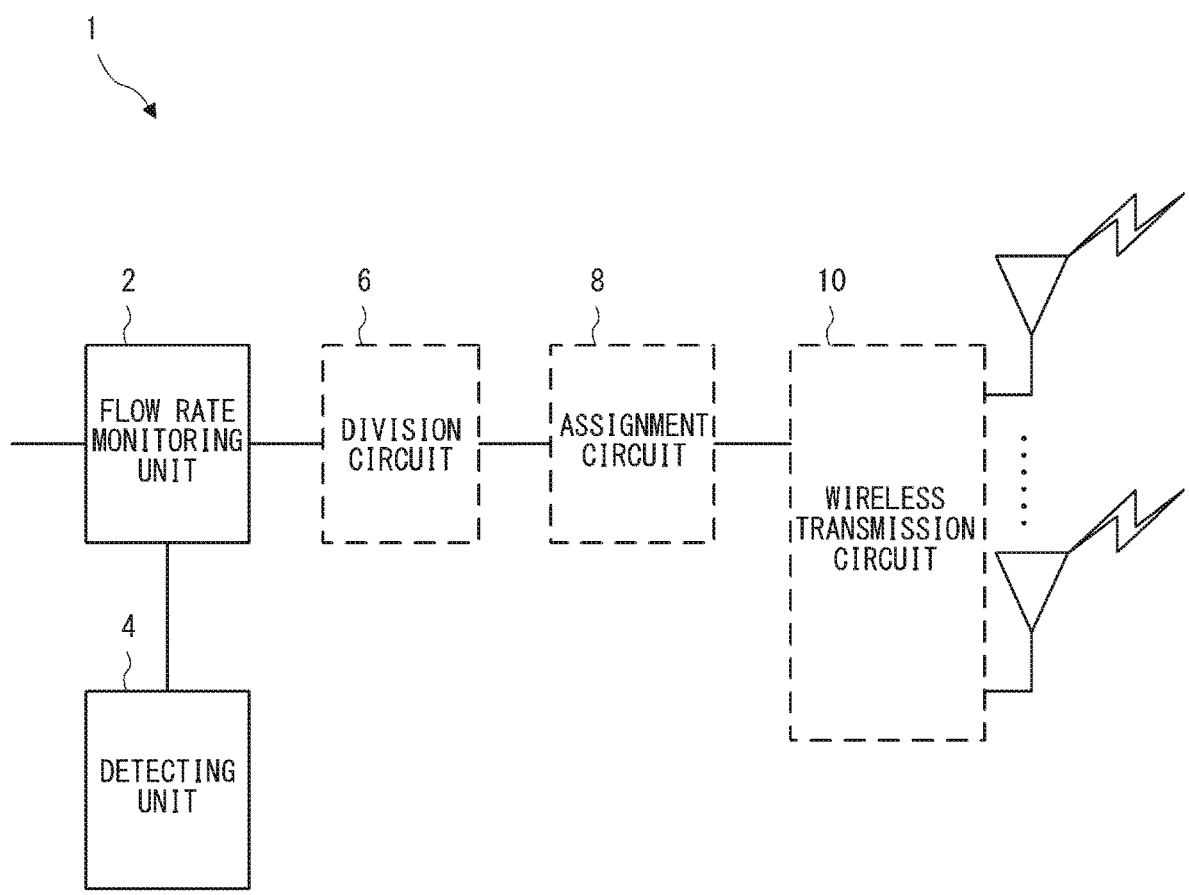
FIG. 1 is a view illustrating the outline of a wireless communication apparatus according to the exemplary embodiments of the present invention.

FIG. 1 is a view illustrating the outline of a wireless communication apparatus 1 according to the exemplary embodiments of the present invention. As illustrated in FIG. 1, the wireless communication apparatus 1 includes a flow rate monitoring unit 2 (flow rate monitoring means), a detecting unit 4 (detecting means), a division circuit 6, an assignment circuit 8 and a wireless transmission circuit 10. In this regard, the division circuit 6, the assignment circuit 8 and the wireless transmission circuit 10 may not be provided in the wireless communication apparatus 1, and may instead be provided in another apparatus which can communicate with the wireless communication apparatus 1.

The division circuit 6 divides, into a plurality of data portions, data transmitted via a virtual circuit (first link) which is a virtual link configured by virtually bundling a plurality of radio links. The assignment circuit 8 assigns each of a plurality of data portions to one of a plurality of radio links. The wireless transmission circuit 10 transmits a plurality of data portions to another wireless communication apparatus via a plurality of radio links to which a plurality of data portions has been assigned. The flow rate monitoring unit 2 monitors a traffic flow rate of the virtual circuit. The detecting unit 4 compares the monitored traffic flow rate with radio bands of the virtual circuit, and detects a surplus of radio bands of the virtual circuit relative to the traffic flow rate.

The wireless communication apparatus 1 according to the exemplary embodiments of the present invention can detect the surplus radio bands of the virtual circuit (first link) configured by bundling a plurality of radio links. Consequently, the wireless communication apparatus 1 according to the exemplary embodiments of the present invention can effectively use the surplus radio bands of the virtual circuit. In addition, a wireless communication method performed by the wireless communication apparatus 1 can detect the surplus radio bands of the virtual circuit, and consequently effectively use the surplus radio bands of the virtual circuit. Similarly, a wireless communication system which includes the wireless communication apparatus 1 and a reception side wireless communication apparatus which receives data from the wireless communication apparatus 1 can detect the surplus radio bands of the virtual circuit, and consequently effectively use the surplus radio bands of the virtual circuit.

First Exemplary Embodiment

The exemplary embodiments of the present invention will be described below with reference to the drawings. In this regard, in the following description, the same reference numerals will be assigned to substantially the same components.

Figure 2:
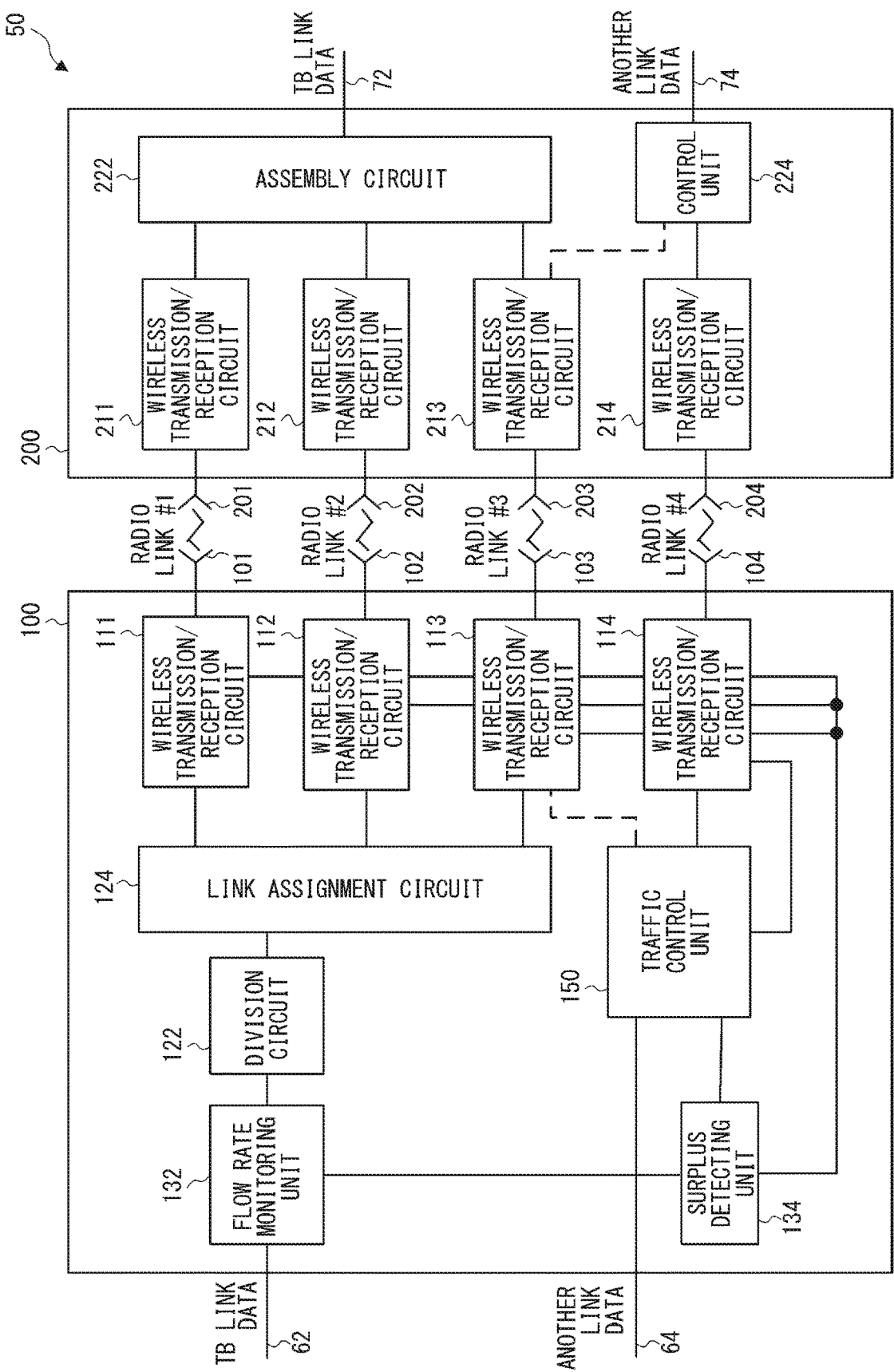
FIG. 2 is a wireless communication system according to the first exemplary embodiment.

FIG. 2 is a wireless communication system 50 according to the first exemplary embodiment. The wireless communication system 50 includes a transmission side wireless communication apparatus 100 (first wireless communication apparatus) and a reception side wireless communication apparatus 200 (second wireless communication apparatus). The wireless communication apparatus 100 and the wireless communication apparatus 200 are connected to be able to perform wireless communication with each other via four radio links #1 to #4. In addition, the wireless communication system 50 may comply with, for example, the Ethernet (registered trademark).

The radio links #1 to #3 are radio links related to traffic bonding. That is, in the first exemplary embodiment, a plurality of the radio links #1 to #3 are bundled to configure a traffic bonding link (TB link) which is a virtual circuit. In other words, the radio links #1 to #3 are radio links which configure the traffic bonding link (virtual circuit; first link). In yet other words, the wireless communication apparatus 100 and the wireless communication apparatus 200 bond three of the radio links #1 to #3 for one traffic to perform wireless communication. That is, the wireless communication apparatus 100 and the wireless communication apparatus 200 perform traffic bonding on the three radio links #1 to #3. Thus, by bonding a plurality of radio links, the wireless communication apparatus 100 and the wireless communication apparatus 200 secure (expand) transmission capacities.

As described above, in the first exemplary embodiment, the radio links #1 #3 are used for the traffic bonding link. On the other hand, the radio link #4 is used as a link (another (i.e., different) link) different from the traffic bonding link. In addition, a type of data (first traffic) transmitted via the traffic bonding link can be different from a type of data (second traffic) transmitted via the another link. The traffic bonding link has transmission capacity (radio band) expanded by bundling a plurality of radio links, and consequently can have a larger transmission capacity than that of the another link which is one radio link. In other words, the traffic bonding link can provide a higher transmission rate than that of the another link.

Hence, for example, the traffic bonding link can be used as a link for large-volume data communication. The another link can be used as a link for communicating a relatively small volume of control information or monitor information. Further, for example, the traffic bonding link can be used as a link for high priority data communication. The another link can be used as a link for low priority data communication. In addition, when there is a surplus of radio bands of the radio links #1 to #3 used for the traffic bonding link, these surplus bands can be used for data communication with the another link. Details will be described below.

The wireless communication apparatus 100 includes wireless transmission/reception circuits 111, 112, 113 and 114, a division circuit 122, a link assignment circuit 124, a flow rate monitoring unit 132, a surplus detecting unit 134 and a traffic control unit 150. The wireless transmission/reception circuits 111, 112, 113 and 114 correspond to a wireless transmission/reception circuit 10 illustrated in FIG. 1. The division circuit 122 corresponds to a division circuit 6 illustrated in FIG. 1. The link assignment circuit 124 corresponds to an assignment circuit 8 illustrated in FIG. 1. Further, the flow rate monitoring unit 132 corresponds to a flow rate monitoring unit 2 (flow rate monitoring means) illustrated in FIG. 1. The surplus detecting unit 134 corresponds to a detecting unit 4 (detecting means) illustrated in FIG. 1.

The wireless transmission/reception circuits 111, 112, 113 and 114, the division circuit 122, the link assignment circuit 124, the flow rate monitoring unit 132, the surplus detecting unit 134 and the traffic control unit 150 are configured as electronic circuits composed of a plurality of electronic elements. Further, the wireless transmission/reception circuits 111, 112, 113 and 114 are associated with the radio link #1, the radio link #2, the radio link #3 and the radio link #4, respectively.

The link assignment circuit 124 may be, for example, a switch circuit. The division circuit 122 is electrically connected with a port of the link assignment circuit 124. The division circuit 122 receives data for the traffic bonding link (traffic bonding link data) transmitted via a data circuit 62. Further, the link assignment circuit 124 is electrically connected with the wireless transmission/reception circuits 111, 112 and 113. In addition, the wireless transmission/reception circuit 111 is connected with a port of the link assignment circuit 124 associated with the radio link #1. Similarly, the wireless transmission/reception circuit 112 is connected with a port of the link assignment circuit 124 associated with the radio link #2. Further, the wireless transmission/reception circuit 113 is connected with a port of the link assignment circuit 124 associated with the radio link #3.

Meanwhile, the wireless transmission/reception circuit 114 is electrically connected with the traffic control unit 150. The traffic control unit 150 is connected with a data circuit 64, and receives data for the another link (another link data) transmitted via the data circuit 64. In addition, the traffic control unit 150 is electrically connected with the wireless transmission/reception circuit 113, too.

The flow rate monitoring unit 132 is arranged between the division circuit 122 and the data circuit 62. That is, the flow rate monitoring unit 132 is electrically connected with the division circuit 122. Further, the flow rate monitoring unit 132 is connected with the data circuit 62. Furthermore, the surplus detecting unit 134 is electrically connected with the flow rate monitoring unit 132. Still further, the surplus detecting unit 134 is electrically connected with the traffic control unit 150. Moreover, the surplus detecting unit 134 is electrically connected with the wireless transmission/reception circuits 111, 112 and 113.

The wireless communication apparatus 200 includes wireless transmission/reception circuits 211, 212, 213 and 214, an assembly circuit 222 and a control unit 224. The wireless transmission/reception circuits 211, 212, 213 and 214, the assembly circuit 222 and the control unit 224 are configured as electronic circuits composed of a plurality of electronic elements. Further, the wireless transmission/reception circuits 211, 212, 213 and 214 are associated with the radio link #1, the radio link #2, the radio link #3 and the radio link #4, respectively.

The assembly circuit 222 is connected with a data circuit 72 for transmitting traffic bonding link data. Further, the assembly circuit 222 is electrically connected with the wireless transmission/reception circuits 211, 212 and 213. In this regard, the wireless transmission/reception circuit 211 is connected with a port of the assembly circuit 222 associated with the radio link #1. Similarly, the wireless transmission/reception circuit 212 is connected with a port of the assembly circuit 222 associated with the radio link #2. Furthermore, the wireless transmission/reception circuit 213 is connected with a port of the assembly circuit 222 associated with the radio link #3.

Meanwhile, the wireless transmission/reception circuit 214 is electrically connected with the control unit 224. The control unit 224 is connected with a data circuit 74 for transmitting the another link data. In addition, the control unit 224 is electrically connected with the wireless transmission/reception circuit 213, too.

The wireless transmission/reception circuit 111 performs wireless communication with the wireless transmission/reception circuit 211 of the wireless communication apparatus 200 via the radio link #1. More specifically, the wireless transmission/reception circuit 111 performs modulation processing on transmission target data (i.e., data to be transmitted). The wireless transmission/reception circuit 111 transmits a radio signal to the wireless transmission/reception circuit 211 via the radio link #1 by using an antenna 101. The wireless transmission/reception circuit 211 receives the radio signal from the wireless transmission/reception circuit 111 via the radio link #1 by using an antenna 201. Further, the wireless transmission/reception circuit 211 performs demodulation processing on the received radio signal. Furthermore, the wireless transmission/reception circuit 111 generates transmission rate information (link rate information) indicating the radio band of the radio link #1.

The wireless transmission/reception circuit 112 performs wireless communication with the wireless transmission/reception circuit 212 of the wireless communication apparatus 200 via the radio link #2. More specifically, the wireless transmission/reception circuit 112 performs modulation processing on transmission target data. The wireless transmission/reception circuit 112 transmits a radio signal to the wireless transmission/reception circuit 212 via the radio link #2 by using an antenna 102. The wireless transmission/reception circuit 212 receives the radio signal from the wireless transmission/reception circuit 112 via the radio link #2 by using an antenna 202. Further, the wireless transmission/reception circuit 212 performs demodulation processing on the received radio signal. Furthermore, the wireless transmission/reception circuit 112 generates transmission rate information (link rate information) indicating the radio band of the radio link #2.

The wireless transmission/reception circuit 113 performs wireless communication with the wireless transmission/reception circuit 213 of the wireless communication apparatus 200 via the radio link #3. More specifically, the wireless transmission/reception circuit 113 performs modulation processing on transmission target data. The wireless transmission/reception circuit 113 transmits a radio signal to the wireless transmission/reception circuit 213 via the radio link #3 by using an antenna 103. The wireless transmission/reception circuit 213 receives the radio signal from the wireless transmission/reception circuit 113 via the radio link #3 by using an antenna 203. Further, the wireless transmission/reception circuit 213 performs demodulation processing on the received radio signal. Furthermore, the wireless transmission/reception circuit 113 generates transmission rate information (link rate information) indicating the radio band of the radio link #3.

The wireless transmission/reception circuit 114 performs wireless communication with the wireless transmission/reception circuit 214 of the wireless communication apparatus 200 via the radio link #4. More specifically, the wireless transmission/reception circuit 114 performs demodulation processing on transmission target data. The wireless transmission/reception circuit 114 transmits a radio signal to the wireless transmission/reception circuit 214 via the radio link #4 by using an antenna 104. The wireless transmission/reception circuit 214 receives the radio signal from the wireless transmission/reception circuit 114 via the radio link #4 by using an antenna 204. Further, the wireless transmission/reception circuit 214 performs demodulation processing on the received radio signal. Furthermore, the wireless transmission/reception circuit 114 generates transmission rate information (link rate information) indicating the radio band of the radio link #4.

In addition, the wireless transmission/reception circuit 111 may monitor a radio wave situation of the radio link #1, performs adaptive modulation processing according to the radio wave situation, and optionally change a modulation scheme. When, for example, the wireless transmission/reception circuit 111 supports AMR (Adaptive Modulation Radio) control, and when a radio link situation changes due to a change in a weather, i.e., when quality of the radio link deteriorates, the wireless transmission/reception circuit 111 may change the modulation scheme in response to this change, and fluctuate a radio band. When, for example, 16 QAM, 64 QAM and 256 QAM which are multi-value (M-ary) modulation schemes are used as modulation schemes, the wireless transmission/reception circuit 111 may select and use one modulation scheme from these modulation schemes according to the radio link situation. Further, similarly, the wireless transmission/reception circuits 112, 113 and 114 may perform the above adaptive modulation processing for the radio link #2 to the radio link #4, respectively.

The division circuit 122 divides the traffic bonding link data which is a traffic complying with, for example, the Ethernet. More specifically, the division circuit 122 divides the traffic bonding link data of a frame format into data portions (e.g., packets) of fixed lengths. Further, the division circuit 122 adds order information to each of a plurality of data portions divided into the fixed lengths. In this regard, the order information is a sequence number indicating an order of each of a plurality of data portions in the traffic bonding link data. Further, the division circuit 122 adds a traffic bonding link data identifier to each data portion. Furthermore, the division circuit 122 outputs a plurality of data portions to the link assignment circuit 124.

The link assignment circuit 124 accepts (i.e., receives) a plurality of data portions from the division circuit 122. Further, the link assignment circuit 124 assigns a plurality of data portions to the radio links #1 to #3. The link assignment circuit 124 transmits the data portions assigned to the radio links #1 to #3, to the wireless transmission/reception circuits 111, 112 and 113, respectively. The wireless transmission/reception circuits 111, 112 and 113 transmit each data portion to the wireless communication apparatus 200 via the radio links #1 to #3, respectively.

In this case, the link assignment circuit 124 does not evenly assign a plurality of data portions to the radio links #1 to #3, but assigns a plurality of data portions unevenly to one of the radio links #1 to #3. In other words, the link assignment circuit 124 assigns a plurality of data portions to the radio links #1 to #3 in a predetermined order. More specifically, the link assignment circuit 124 assigns to a first radio link a data portion having a volume corresponding to the radio band of the first radio link. Next, the link assignment circuit 124 assigns to the second radio link a data portion of the rest of data portion having a volume corresponding to the radio band of the second radio link. Subsequently, the link assignment circuit 124 assigns the rest of data portions to a next radio link in the same way. The data portions are assigned in this way. Therefore, when a traffic flow rate of the traffic bonding link data is low, only a data portion having a smaller volume than a radio band of a lastly assigned radio link is likely to be assigned to the lastly assigned radio link. That is, this radio link has a surplus band (i.e., a surplus band occurs in this radio link).

In addition, according to the order that the link assignment circuit 124 assigns data portions to the radio links, for example, the link assignment circuit 124 may assign the data portions in order from a radio link of a smaller link number, i.e., the radio link #1. When, for example, the radio bands of the radio links #1 to #3 are respectively 100 Mbps, the link assignment circuit 124 first assigns the data portion having the volume of 100 Mbps, from among the plurality of data portions, to the radio link #1. Next, the link assignment circuit 124 assigns a data portion having the volume of 100 Mbps, from among the rest of the plurality of data portions, to the radio link #2. Next, the link assignment circuit 124 assigns the rest of a plurality of data portions to the radio link #3. Thus, when the traffic flow rate is low, the radio link #3 has the surplus band.

The flow rate monitoring unit 132 monitors the traffic flow rate of the traffic bonding link data. Further, the flow rate monitoring unit 132 outputs actual rate information indicating the traffic flow rate (actual rate) to the surplus detecting unit 134. In addition, the flow rate monitoring unit 132 outputs the inflow traffic (traffic bonding link data) to the subsequent division circuit 122.

Further, the wireless transmission/reception circuit 111 outputs link rate information indicating the radio band of the radio link #1 to the surplus detecting unit 134. Similarly, the wireless transmission/reception circuits 112 and 113 respectively output link rate information indicating radio bands of the radio link #2 and the radio link #3 to the surplus detecting unit 134.

The surplus detecting unit 134 accepts the actual rate information from the flow rate monitoring unit 132. Furthermore, the surplus detecting unit 134 obtains the link rate information of the radio links #1 to #3 respectively from the wireless transmission/reception circuits 111, 112 and 113. The surplus detecting unit 134 calculates a total of link rates of the radio links #1 to #3 used for traffic bonding.

Further, the surplus detecting unit 134 compares the actual rate (traffic flow rate) with the total of the link rates of the radio links #1 to #3 (radio bands of a virtual circuit related to the traffic bonding). When the total of the link rates of the radio links #1 to #3 is higher than the actual rate, the surplus detecting unit 134 decides that there is a surplus band in the virtual circuit (traffic bonding link) related to the traffic bonding.

In this case, the surplus detecting unit 134 detects the surplus band (surplus rate) of the traffic bonding link. More specifically, the surplus detecting unit 134 subtracts the actual rate from the total of the link rates of the radio links #1 to #3. This subtraction result (difference) corresponds to the surplus band. The surplus detecting unit 134 outputs surplus rate information indicating the surplus band (surplus rate) to the traffic control unit 150.

Figure 3:
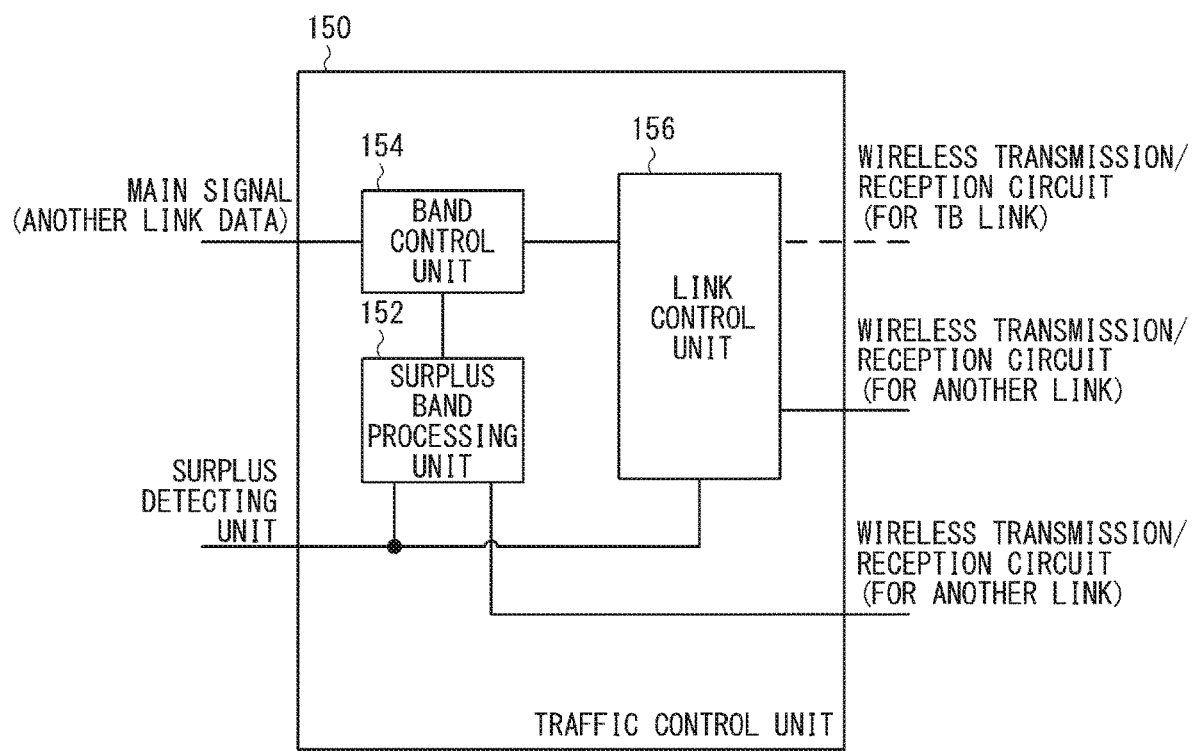
FIG. 3 is a view illustrating a configuration of the traffic control unit according to the first exemplary embodiment.

FIG. 3 is a view illustrating a configuration of the traffic control unit 150 according to the first exemplary embodiment. The traffic control unit 150 includes a surplus band processing unit 152, a band control unit 154 and a link control unit 156. The traffic control unit 150 accepts a main signal (another link data) transmitted via the data circuit 64. Further, the traffic control unit 150 obtains the surplus rate information from the surplus detecting unit 134. In addition, as described below, the traffic control unit 150 functions as control means for controlling a link of the surplus radio band when there is a surplus of radio bands of a virtual circuit relative to the traffic flow rate.

The surplus band processing unit 152 accepts the surplus rate information output from the surplus detecting unit 134. Further, the surplus band processing unit 152 obtains the transmission rate information (link rate information) indicating the radio band of the radio link #4, from the wireless transmission/reception circuit 114 which is used as the another link. The surplus band processing unit 152 calculates a total of the surplus rate and the radio band (link rate) of the radio link #4, and generates band control information indicating a total transmission rate. This band control information indicates a radio band which can be used to transmit another link data. The surplus band processing unit 152 outputs the generated band control information to the band control unit 154.

The band control unit 154 accepts the main signal (another link data) transmitted via the data circuit 64. The band control unit 154 performs band control on the main signal (another link data) according to the band control information. That is, the band control unit 154 performs control to transmit the main signal (another link data) at the transmission rate indicated by the band control information. Further, the band control unit 154 outputs the main signal (another link data) subjected to the band control to the link control unit 156.

The link control unit 156 accepts the surplus rate information from the surplus detecting unit 134. The link control unit 156 outputs data corresponding to the surplus band indicated by the surplus rate information in the main signal (another link data) subjected to the band control, to the wireless transmission/reception circuit 113 which is used as the traffic bonding link. On the other hand, the link control unit 156 outputs the rest of data in the main signal (another link data) subjected to the band control, to the wireless transmission/reception circuit 114 which is used for the another link. In this case, the link control unit 156 adds an identifier indicating the another link data, to the data output to the wireless transmission/reception circuit 113 so that the reception side wireless communication apparatus 200 distinguishes between the traffic bonding link data and the another link data.

The wireless transmission/reception circuits 111, 112 and 113 transmit the data portions of the traffic bonding link data respectively assigned by the link assignment circuit 124, to the wireless transmission/reception circuits 211, 212 and 213 via the radio links #1 to #3, respectively. In addition, the wireless transmission/reception circuit 113 can accept part of the another link data from the traffic control unit 150. Therefore, the wireless transmission/reception circuit 113 can transmit the part of the another link data, too, to the wireless transmission/reception circuit 213 via the radio link #3. Furthermore, the wireless transmission/reception circuit 114 transmits part of the another link data output from the traffic control unit 150, to the wireless transmission/reception circuit 214 via the radio link #4.

The wireless transmission/reception circuits 211, 212 and 213 output to the assembly circuit 222 the data portions of the traffic bonding link data received via the radio links #1 to #3, respectively. The assembly circuit 222 assembles a plurality of data portions according to the identifier and the order information added to the data portions, and generates (restores) the original traffic bonding link data. In this case, the assembly circuit 222 removes the identifier and the order information added to the data portions. Further, the assembly circuit 222 transmits the restored traffic bonding link data to the data circuit 72.

In addition, the wireless transmission/reception circuit 213 can receive part of the another link data from the wireless transmission/reception circuit 113. When the identifier indicating the another link data is added to the received data, the wireless transmission/reception circuit 213 outputs this data to the control unit 224. Further, the wireless transmission/reception circuit 214 outputs to the control unit 224 the another link data (or the part of the another link data) received via the radio link #4.

The control unit 224 accepts the another link data from the wireless transmission/reception circuit 214, and transmits the another link data to the data circuit 74. In addition, the control unit 224 accepts part of the another link data from the wireless transmission/reception circuit 213 in some cases. In this case, the control unit 224 assembles the part of the another link data from the wireless transmission/reception circuit 213 and the part of the another link data from the wireless transmission/reception circuit 214 to restore the original another link data. Further, the control unit 224 transmits the restored another link data to the data circuit 74.

Next, an operation of the wireless communication apparatus 100 according to the first exemplary embodiment will be described by using a specific example.

Figure 4:
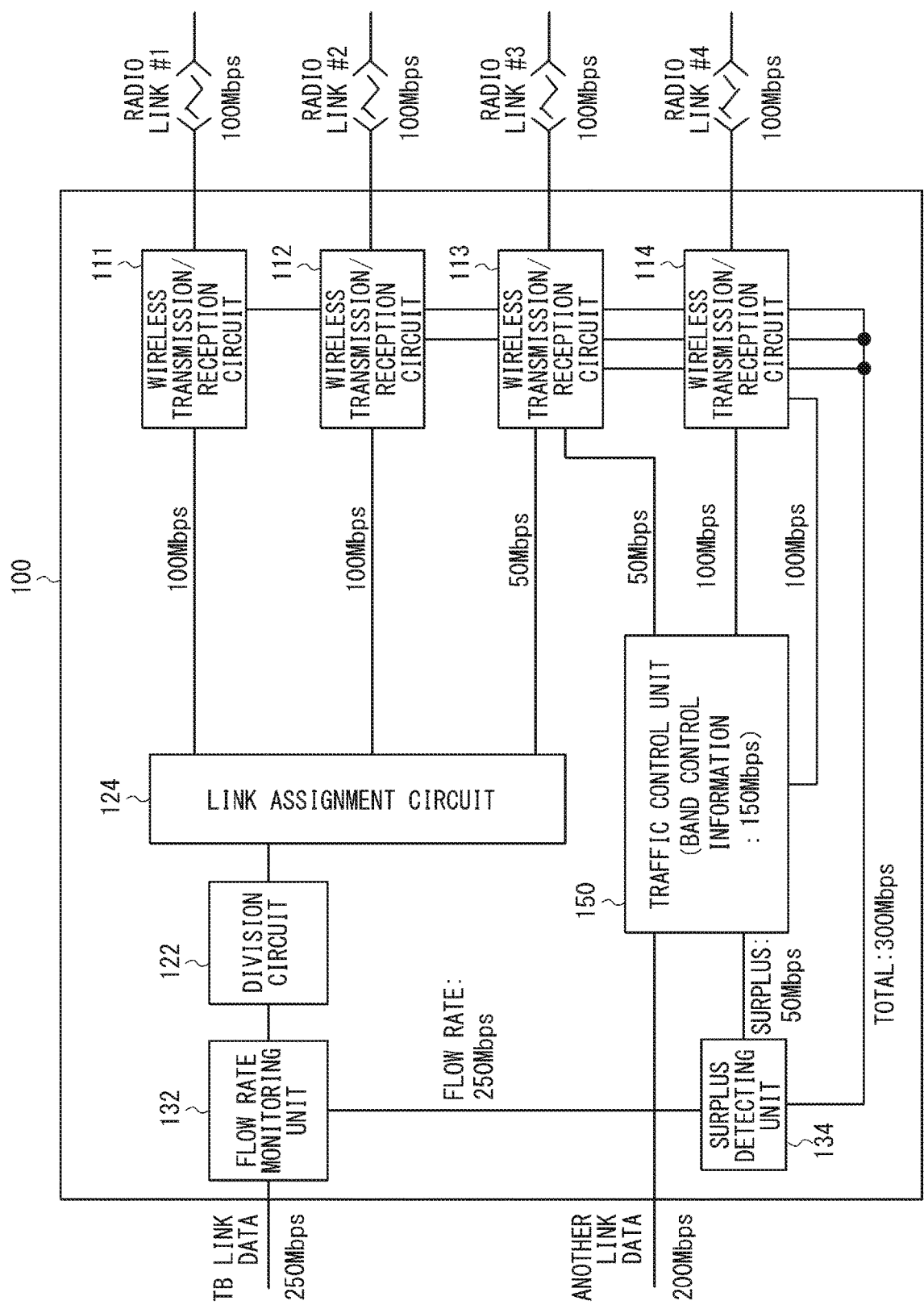
FIG. 4 is a view illustrating the specific example for explaining the operation of the wireless communication apparatus according to the first exemplary embodiment.

FIG. 4 is a view illustrating the specific example for explaining the operation of the wireless communication apparatus 100 according to the first exemplary embodiment. In the specific example illustrated in FIG. 4, the radio bands of the radio links #1 to #4 are respectively 100 Mbps. Further, the traffic flow rate (actual rate) of the traffic bonding link data is 250 Mbps. Furthermore, the traffic flow rate (input rate) of the another link data is 200 Mbps.

The link assignment circuit 124 assigns to the wireless transmission/reception circuit 111 the data portion corresponding to 100 Mbps which is the radio band of the radio link #1 among the data portions of the traffic bonding link data. Further, the link assignment circuit 124 assigns to the wireless transmission/reception circuit 112 the data portion corresponding to 100 Mbps which is the radio band of the radio link #2 among the rest of the data portions of the traffic bonding link data. Furthermore, the link assignment circuit 124 assigns to the wireless transmission/reception circuit 113 the data portion corresponding to 50 Mbps which is the rest of the data portions of the traffic bonding link data.

The flow rate monitoring unit 132 outputs actual rate information indicating "250 Mbps" as the traffic flow rate (actual rate) to the surplus detecting unit 134. The surplus detecting unit 134 accepts link rate information indicating "100 Mbps" as the radio band, from the wireless transmission/reception circuits 111, 112 and 113, respectively. The surplus detecting unit 134 calculates the total of the link rates as 100+100+100=300 (Mbps). Further, the surplus detecting unit 134 calculates the surplus band as 300−250=50 (Mbps). The surplus detecting unit 134 outputs surplus rate information indicating "50 Mbps" as the surplus band to the traffic control unit 150.

The surplus band processing unit 152 of the traffic control unit 150 accepts from the wireless transmission/reception circuit 114 the link rate information indicating 100 Mbps as the radio band. Further, the surplus band processing unit 152 calculates a total of the surplus rate "50 Mbps" and the link rate "100 Mbps", and calculates the transmission rate "150 Mbps". The surplus band processing unit 152 generates band control information indicating the transmission rate "150 Mbps". The band control unit 154 of the traffic control unit 150 performs band control on the another link data at 150 Mbps.

The link control unit 156 of the traffic control unit 150 outputs to the wireless transmission/reception circuit 113 the data portion corresponding to 50 Mbps which is the surplus band of the another link data. Further, the link control unit 156 outputs to the wireless transmission/reception circuit 114 the data portion corresponding to 100 Mbps which is the radio band of the radio link #4. The wireless transmission/reception circuits 111 and 112 transmit the data portions of the traffic bonding link data in the radio bands of 100 Mbps. The wireless transmission/reception circuit 113 transmits the data portion of the traffic bonding link data in the radio band of 50 Mbps, and transmits part of the another link data in the radio band of 50 Mbps. The wireless transmission/reception circuit 114 transmits part of the another link data in the radio band of 100 Mbps. Thus, the surplus band (50 Mbps) of the traffic bonding link (radio links #1 to #3) is used to transmit the another link data.

Figure 5:
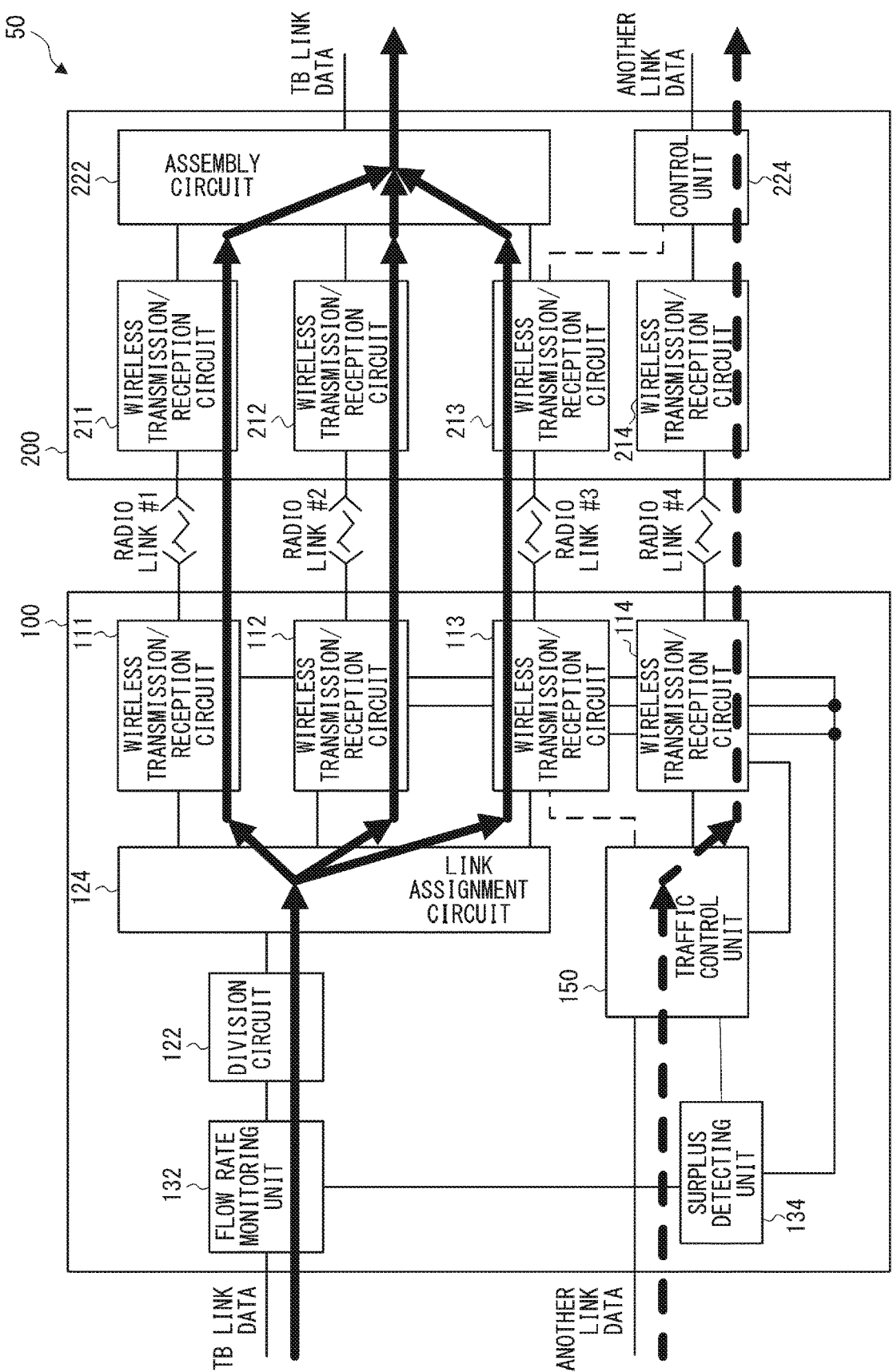
FIG. 5 is a view schematically illustrating transmission of the traffic bonding link data and the another link data in the wireless communication system according to the first exemplary embodiment.
Figure 6:
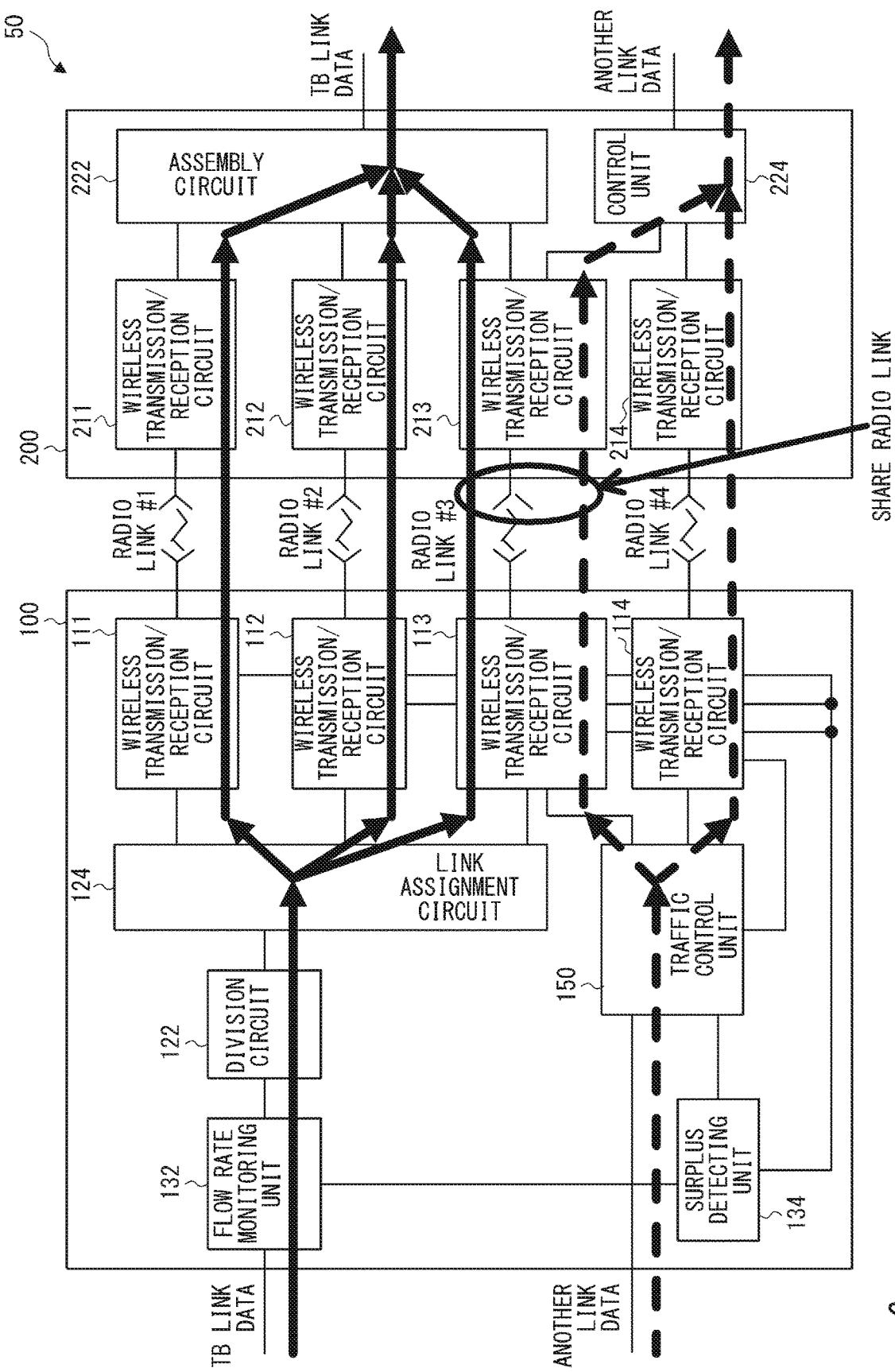
FIG. 6 is a view schematically illustrating transmission of the traffic bonding link data and the another link data in the wireless communication system according to the first exemplary embodiment.

FIGS. 5 and 6 are views schematically illustrating transmission of the traffic bonding link data and the another link data in the wireless communication system 50 according to the first exemplary embodiment. FIG. 5 illustrates a case where there is no surplus band of the traffic bonding link. FIG. 6 illustrates a case where there is a surplus band of the traffic bonding link. Further, bold solid lines indicate flows of the traffic bonding link data, and bold broken lines indicate flows of the another link data.

When the traffic flow rate (actual rate) of the traffic bonding link data is equal to or more than radio bands secured by the traffic bonding, all radio bands of the radio links #1 to #3 are used for the traffic bonding link data. That is, the radio bands of the traffic bonding link do not have a surplus band. Therefore, in this case, as illustrated in FIG. 5, a traffic of the another link data is transmitted only via the radio link #4 which is a link different from the traffic bonding link. In this case, the traffic control unit 150 does not output the another link data to the wireless transmission/reception circuit 113.

On the other hand, when the traffic flow rate (actual rate) of the traffic bonding link data is lower than the radio bands secured by the traffic bonding, there is a surplus band of the radio bands of the traffic bonding link. Therefore, the another link data can be transmitted by using this surplus band, too. That is, as illustrated in FIG. 6, the traffic of the another link data is transmitted by sharing part of the traffic bonding link (the radio link #3 in the example in FIG. 6).

Figure 7:
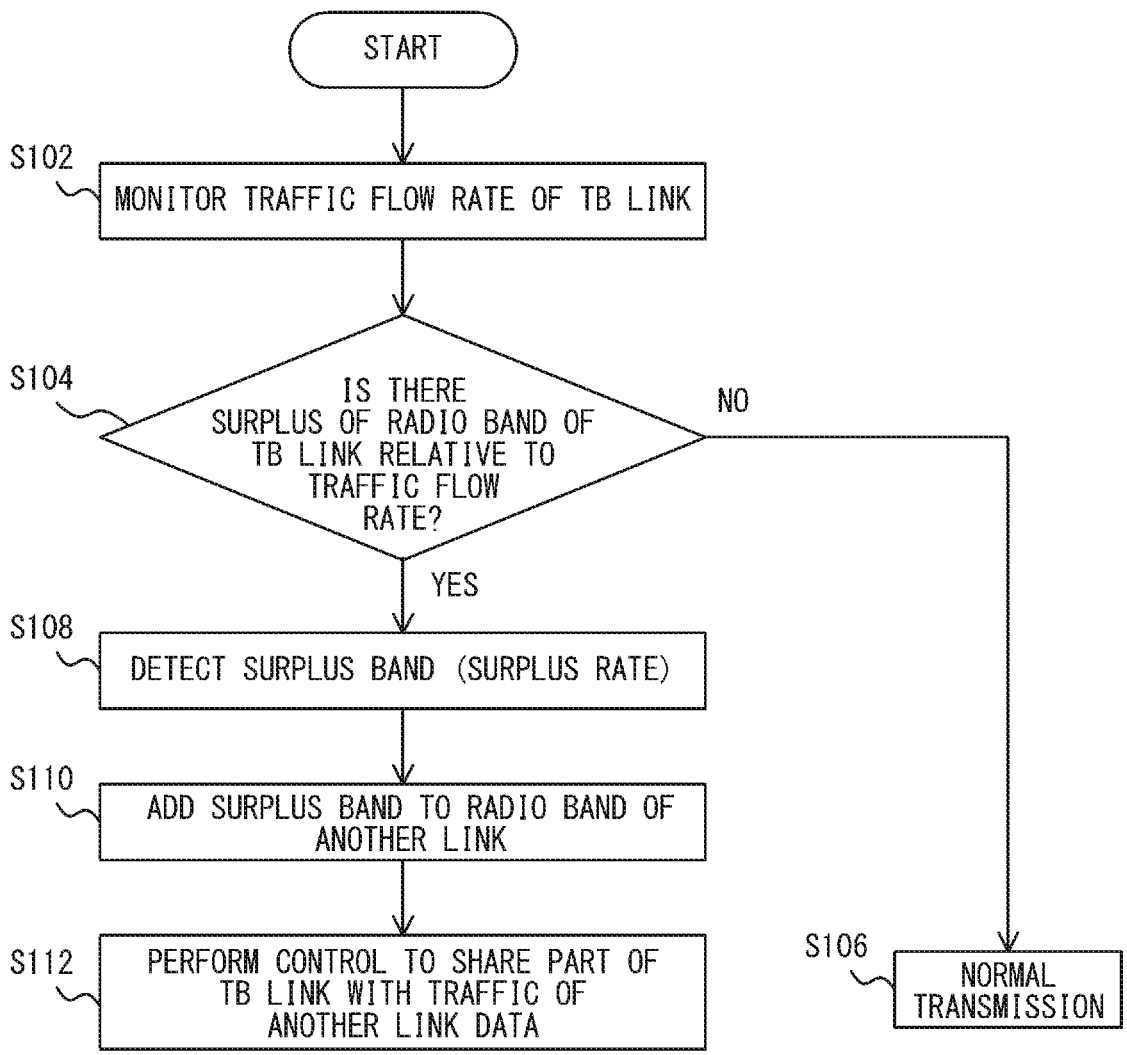
FIG. 7 is a flowchart illustrating the wireless communication method performed by the wireless communication apparatus according to the first exemplary embodiment.

FIG. 7 is a flowchart illustrating the wireless communication method performed by the wireless communication apparatus 100 according to the first exemplary embodiment. First, the wireless communication apparatus 100 monitors the traffic flow rate of the traffic bonding link (step S102). More specifically, as described above, the flow rate monitoring unit 132 monitors the traffic flow rate of the traffic bonding link data.

The wireless communication apparatus 100 decides whether or not there is a surplus of the radio bands of the traffic bonding link relative to the traffic flow rate (step S104). More specifically, as described above, the surplus detecting unit 134 compares the traffic flow rate with the total of the link rates of the radio links #1 to #3, and decides that there is a surplus band of the traffic bonding link when the total of the link rates of the radio links #1 to #3 is higher than the traffic flow rate.

When it is decided that there is no surplus band (NO in S104), the wireless communication apparatus 100 performs normal transmission as illustrated in FIG. 5 (step S106). That is, the wireless communication apparatus 100 transmits a traffic of the traffic bonding link data and a traffic of the another link data by using different radio links. On the other hand, when it is decided that there is the surplus band (YES in S104), the surplus detecting unit 134 detects the surplus band (surplus rate) of the traffic bonding link as described above (step S108).

The wireless communication apparatus 100 performs control to add the surplus band to the radio band of the another link (step S110). More specifically, the surplus band processing unit 152 of the traffic control unit 150 calculates a total of the surplus rate and the radio band (link rate) of the radio link #4 which is the another link, and generates band control information indicating a total transmission rate. Further, the band control unit 154 of the traffic control unit 150 performs band control on the main signal (another link data) according to the band control information. In this way, the traffic control unit 150 performs control to add the surplus band to the radio band of the another link.

The wireless communication apparatus 100 performs control to share part of the traffic bonding link with the traffic of the another link data (step S112). More specifically, the link control unit 156 of the traffic control unit 150 outputs a data portion of the another link data corresponding to the surplus band, to the wireless transmission/reception circuit 113 which is used as the traffic bonding link. In this way, the traffic control unit 150 performs control to share part (corresponding to the surplus band) of the traffic bonding link with the traffic of the another link data.

As described above, in the first exemplary embodiment, the wireless communication apparatus 100 monitors the traffic flow rate of the traffic bonding link data, and compares this traffic flow rate with the radio band of the traffic bonding link. Consequently, the wireless communication apparatus 100 can detect the surplus band of the virtual circuit (i.e., virtual line). Particularly, the surplus detecting unit 134 obtains the link rate information of the radio links #1 to #3 from the wireless transmission/reception circuits 111, 112 and 113, respectively, and consequently can precisely detect the surplus band at this point of time.

When the surplus band cannot be detected, it is difficult to perform control to effectively use this surplus band. That is, when the surplus band cannot be detected, it is not possible to effectively use this surplus band. On the other hand, in the present exemplary embodiment, the surplus band can be detected, so that it is possible to effectively use the surplus band of the traffic bonding link.

Further, in the first exemplary embodiment, it is possible to share the surplus band of the traffic bonding link with the traffic of the another link data. Consequently, even when the traffic flow rate of the another link data is high compared to the radio band of the another link, it is possible to suppress transmission delay of the traffic of the another link data. That is, according to the first exemplary embodiment, it is possible to effectively use the surplus band of the traffic bonding link.

Second Exemplary Embodiment

Next, the second exemplary embodiment will be described. The second exemplary embodiment differs from the first exemplary embodiment in using as a standby link a surplus radio link (first radio link) among a plurality of radio links which configure a traffic bonding link.

Figure 8:
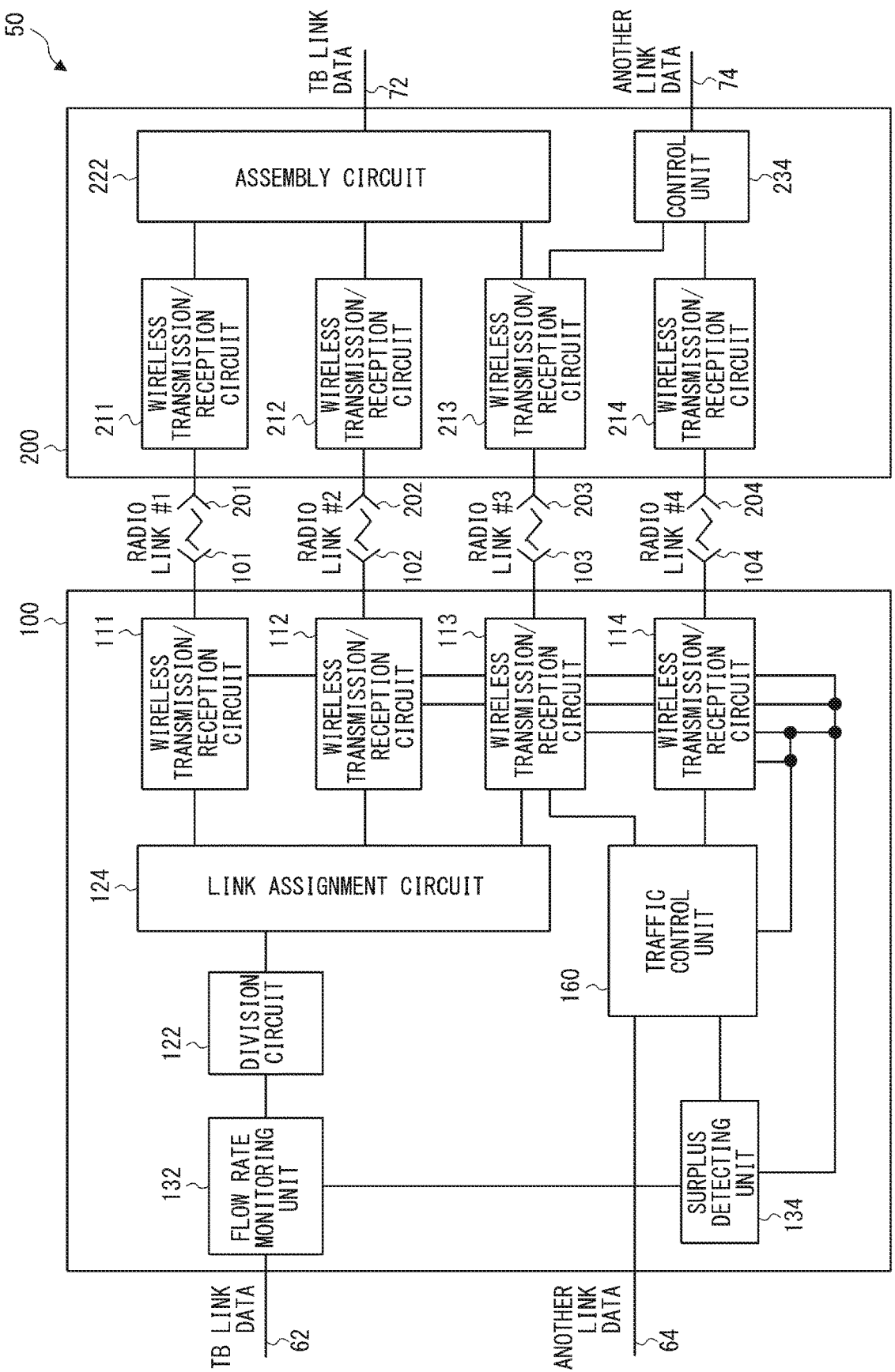
FIG. 8 is a view illustrating a wireless communication system according to the second exemplary embodiment.

FIG. 8 is a view illustrating a wireless communication system 50 according to the second exemplary embodiment. Similar to the first exemplary embodiment, the wireless communication system 50 according to the second exemplary embodiment includes a transmission side wireless communication apparatus 100 (first wireless communication apparatus) and a reception side wireless communication apparatus 200 (second wireless communication apparatus). The wireless communication apparatus 100 and the wireless communication apparatus 200 are connected to be able to perform wireless communication with each other via four of a radio link #1 to a radio link #4. The radio link #1 to the radio link #4 are the same as those in the first exemplary embodiment, and therefore will not be described.

The wireless communication apparatus 100 includes wireless transmission/reception circuits 111, 112, 113 and 114, a division circuit 122, a link assignment circuit 124, a flow rate monitoring unit 132, a surplus detecting unit 134 and a traffic control unit 160. In addition, the wireless transmission/reception circuits 111, 112, 113 and 114, the division circuit 122, the link assignment circuit 124, the flow rate monitoring unit 132 and the surplus detecting unit 134 are substantially the same as those in the first exemplary embodiment, and therefore will not be described.

Further, in the second exemplary embodiment, a traffic control unit 150 according to the first exemplary embodiment is replaced with the traffic control unit 160. The traffic control unit 160 is configured as an electronic circuit composed of a plurality of electronic elements. Details will be described below. In addition, as described below, the traffic control unit 160 functions as control means for controlling a link of a surplus radio band when there is a surplus of radio bands of a virtual circuit relative to a traffic flow rate.

The wireless communication apparatus 200 includes wireless transmission/reception circuits 211, 212, 213, 214, an assembly circuit 222 and a control unit 234. The wireless transmission/reception circuits 211, 212, 213 and 214 and the assembly circuit 222 are substantially the same as those in the first exemplary embodiment, and therefore will not be described. Further, in the second exemplary embodiment, a control unit 224 according to the first exemplary embodiment is replaced with the control unit 234. The control unit 234 is configured as an electronic circuit composed of a plurality of electronic elements. Details will be described below.

Figure 9:
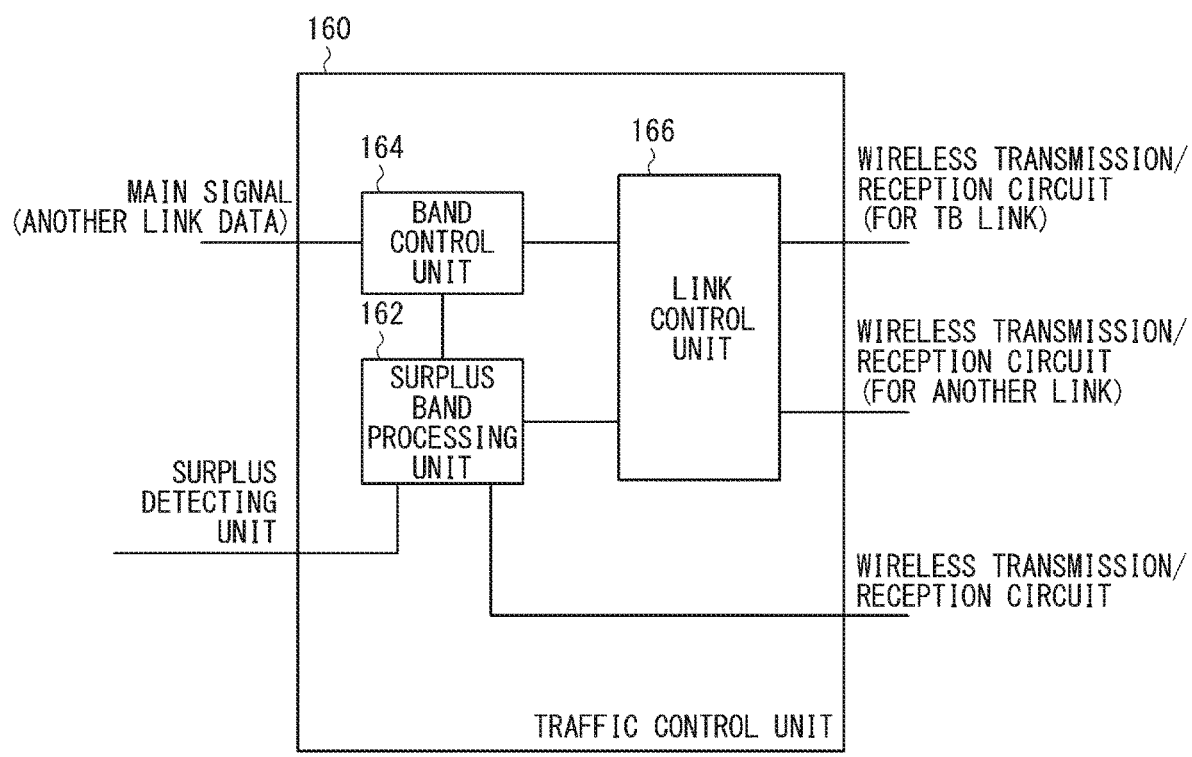
FIG. 9 is a view illustrating a configuration of the traffic control unit according to the second exemplary embodiment.

FIG. 9 is a view illustrating a configuration of the traffic control unit 160 according to the second exemplary embodiment. The traffic control unit 160 includes a surplus band processing unit 162, a band control unit 164 and a link control unit 166. The traffic control unit 160 accepts a main signal (another link data) transmitted via a data circuit 64. Further, the traffic control unit 160 obtains surplus rate information from the surplus detecting unit 134.

Similar to a surplus band processing unit 152, the surplus band processing unit 162 accepts surplus rate information output from the surplus detecting unit 134. Further, similar to the surplus band processing unit 152, the surplus band processing unit 162 obtains link rate information indicating a radio band of the radio link #4 from the wireless transmission/reception circuit 114 which is used as another link. The surplus band processing unit 162 generates band control information indicating the radio band of the radio link #4. The surplus band processing unit 162 outputs the generated band control information to the band control unit 154.

The band control unit 164 accepts the main signal (another link data) transmitted via the data circuit 64. Further, the band control unit 164 performs band control on the main signal (another link data) according to the band control information. The band control unit 164 outputs to the link control unit 166 the main signal (another link data) subjected to the band control in the radio band of the radio link #4.

In this regard, in the second exemplary embodiment, the surplus band processing unit 162 obtains link rate information indicating the radio band of the radio link #3 from the wireless transmission/reception circuit 113 which is used as a traffic bonding link. The surplus band processing unit 162 decides whether or not a surplus band (surplus rate) is the radio band (link rate) of the radio link #3 or more. Further, when the surplus band is the radio band of the radio link #3 or more, the surplus band processing unit 162 outputs, to the link control unit 166, a signal (one link surplus signal) indicating that an entire radio band of one radio link (radio link #3) is a surplus.

The link control unit 166 outputs the main signal (another link data) subjected to the band control, to the wireless transmission/reception circuit 114 which is used as the another link. On the other hand, when accepting one link surplus signal, the link control unit 166 outputs a standby control signal which is a control signal for using the radio link #3 as a standby link, to the wireless transmission/reception circuit 113 which is used as the traffic bonding link. In this case, the link control unit 166 outputs the standby control signal to the wireless transmission/reception circuit 114. The link control unit 166 transmits the standby control signal to transmit to the reception side reception wireless communication apparatus 200.

The wireless transmission/reception circuit 113 having accepted the standby control signal performs control to use the radio link #3 as the standby link. More specifically, when a communication failure does not occur in an active link (e.g., radio link #2), the wireless transmission/reception circuit 113 performs control not to use the wireless radio link #3. On the other hand, when a communication failure occurs in the active link (e.g., the radio link #2), the wireless transmission/reception circuit 113 performs control to use the radio link #3 instead of the radio link #2. The "communication failure" described herein includes a failure caused by environment (such as weather) and a failure (such as power interruption) of the wireless transmission/reception circuits.

Further, the wireless transmission/reception circuit 114 transmits the main signal (another link data) and the standby control signal to the wireless transmission/reception circuit 214 via the radio link #4. The wireless transmission/reception circuit 214 outputs the another link data and the standby control signal to the control unit 234. The control unit 234 transmits the another link data to a data circuit 74, and outputs the standby control signal to the wireless transmission/reception circuit 213. Similar to the above wireless transmission/reception circuit 113, the wireless transmission/reception circuit 213 having accepted the standby control signal performs control to use the radio link #3 as the standby link.

Figure 10:
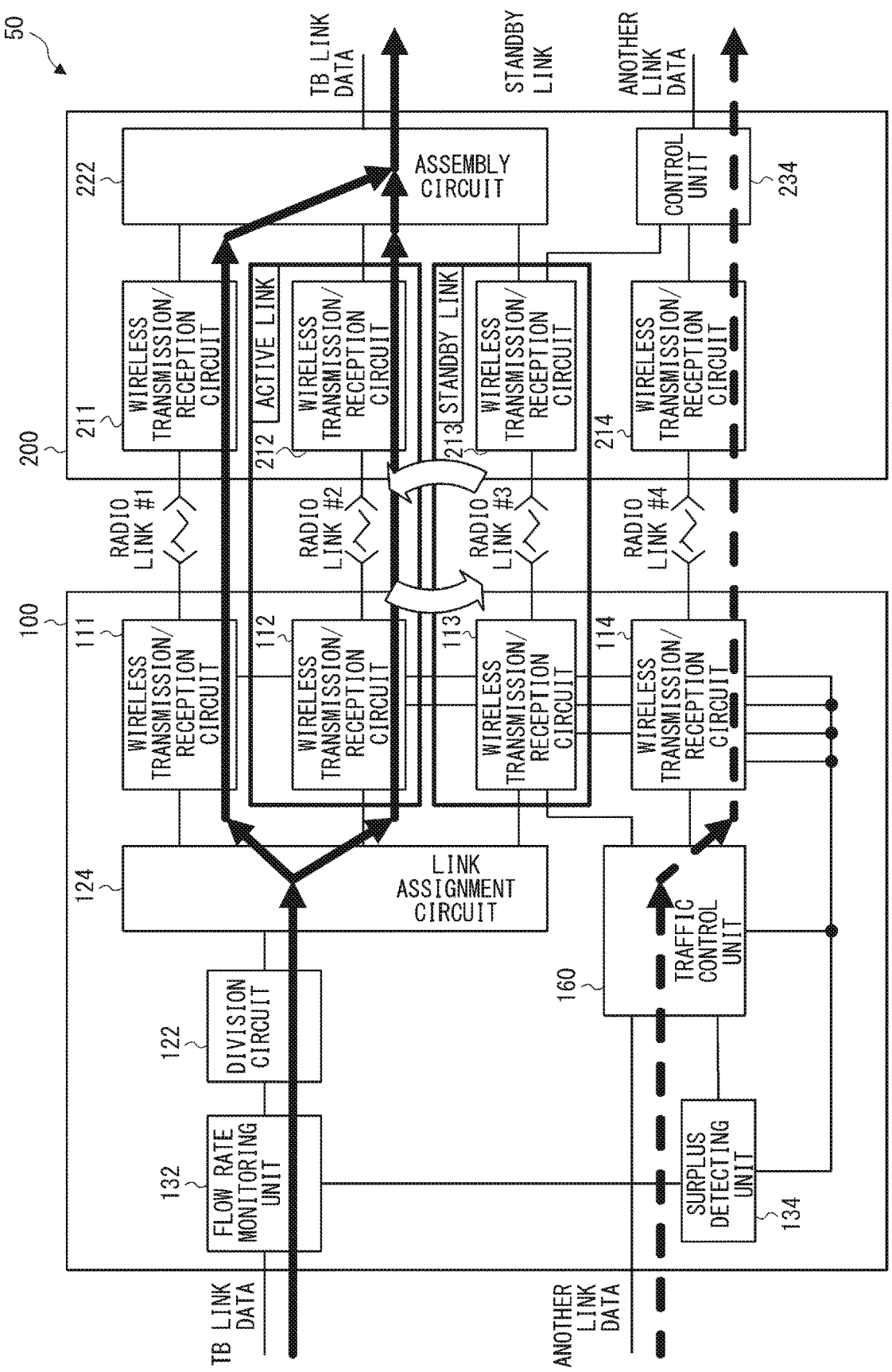
FIG. 10 is a view schematically illustrating transmission of the traffic bonding link data and the another link data in the wireless communication system according to the second exemplary embodiment.

FIG. 10 is a view schematically illustrating transmission of the traffic bonding link data and the another link data in the wireless communication system 50 according to the second exemplary embodiment. When radio bands secured by the traffic bonding have a surplus band equal to or more than a radio band of one radio link (radio link #3) relative to the traffic flow rate of the traffic bonding link data, the radio link #3 is used as the standby link. That is, a traffic of the traffic bonding link data is transmitted by using the radio links #1 and #2. Further, when a communication failure occurs in the radio link #2 which is the active link, use of the radio link #2 is interrupted, and the radio link #3 is used. In addition, the traffic of the another link data is transmitted via the radio link #4 which is a link different from the traffic bonding link.

Figure 11:
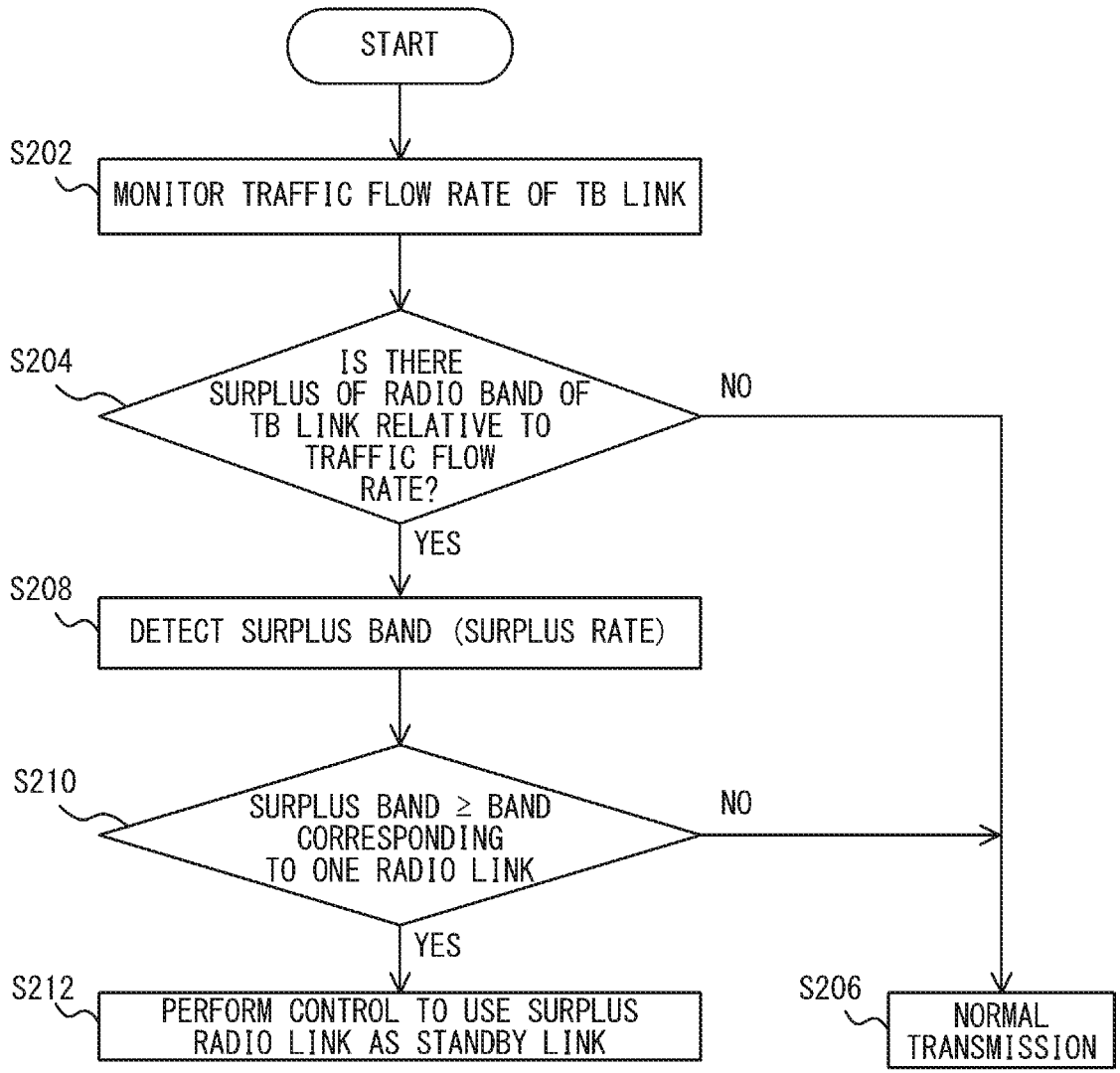
FIG. 11 is a flowchart illustrating a wireless communication method performed by the wireless communication apparatus according to the second exemplary embodiment.

FIG. 11 is a flowchart illustrating a wireless communication method performed by the wireless communication apparatus 100 according to the second exemplary embodiment. Similar to processing in S102, the flow rate monitoring unit 132 of the wireless communication apparatus 100 monitors the traffic flow rate of the traffic bonding link (step S202). Similar to processing in S104, the surplus detecting unit 134 of the wireless communication apparatus 100 decides whether or not there is a surplus of radio bands of the traffic bonding link relative to the traffic flow rate (step S204). When it is decided that there is no surplus band (NO in S204), the wireless communication apparatus 100 performs normal transmission as illustrated in FIG. 5 (step S206). On the other hand, when it is decided that there is the surplus band (YES in S204), the surplus detecting unit 134 detects the surplus band of the traffic bonding link similar to processing in S108 (step S208).

The wireless communication apparatus 100 decides whether or not the detected surplus band is a radio band of one radio link or more (step S210). More specifically, as described above, the surplus band processing unit 162 decides whether or not the surplus band is, for example, the radio band of the radio link #3 or more. When it is decided that the surplus band is less than the radio band of the one radio band (NO in S210), the wireless communication apparatus 100 performs the normal transmission as illustrated in FIG. 5 (step S206).

On the other hand, when it is decided that the surplus band is the radio band of the one radio link or more (YES in S210), the wireless communication apparatus 100 performs control to use the surplus radio link as the standby link (step S212). More specifically, the link control unit 166 outputs the standby control signal to the wireless transmission/reception circuit 113. Further, the link control unit 166 outputs the standby control signal to the wireless transmission/reception circuit 114 to transmit the standby control signal to the reception side wireless communication apparatus 200. In this way, the link control unit 166 performs control to use the surplus radio link #3 as the standby link.

As described above, in the second exemplary embodiment, the surplus radio link is used as the standby link. Thus, the radio link is made redundant. Consequently, it is possible to improve quality of the radio link. Consequently, it is possible to effectively use the surplus radio bands.

Third Exemplary Embodiment

Next, the third exemplary embodiment will be described. The third exemplary embodiment differs from the second exemplary embodiment in shutting down a surplus radio link (first radio link) among a plurality of radio links which configure a traffic bonding link. In addition, a configuration of a wireless communication system 50 according to the third exemplary embodiment is substantially the same as that of the wireless communication system 50 according to the second exemplary embodiment, and therefore will not be described. Further, a configuration of a transmission side wireless communication apparatus 100 (first wireless communication apparatus) and a configuration of a reception side wireless communication apparatus 200 (second wireless communication apparatus) according to the third exemplary embodiment are also substantially the same as those of the second exemplary embodiment, and therefore will not be described. Meanwhile, an operation of a traffic control unit 160 according to the third exemplary embodiment differs from that of the second exemplary embodiment. Operations different from those of the second exemplary embodiment will be described.

When receiving a one link surplus signal, a link control unit 166 outputs a shut-down control signal which is a control signal for shutting down a radio link #3, to a wireless transmission/reception circuit 113 which is used as the traffic bonding link. In this case, the link control unit 166 outputs the shut-down control signal to a wireless transmission/reception circuit 114, too. The link control unit 166 outputs the shut-down control signal to transmit to the reception side wireless communication apparatus 200.

The wireless transmission/reception circuit 113 having received the shut-down control signal performs control to shut down the radio link #3. More specifically, the wireless transmission/reception circuit 113 powers off the wireless transmission/reception circuit 113. Further, the wireless transmission/reception circuit 114 outputs a main signal (another link data) and the shut-down control signal to a wireless transmission/reception circuit 214 via a radio link #4. The wireless transmission/reception circuit 214 outputs the received another link data and shut-down control signal to a control unit 234. The control unit 234 transmits the another link data to a data circuit 74, and outputs the shut-down control signal to a wireless transmission/reception circuit 213. The wireless transmission/reception circuit 213 having received the shut-down control signal performs the same control as that performed by the above wireless transmission/reception circuit 113.

Figure 12:
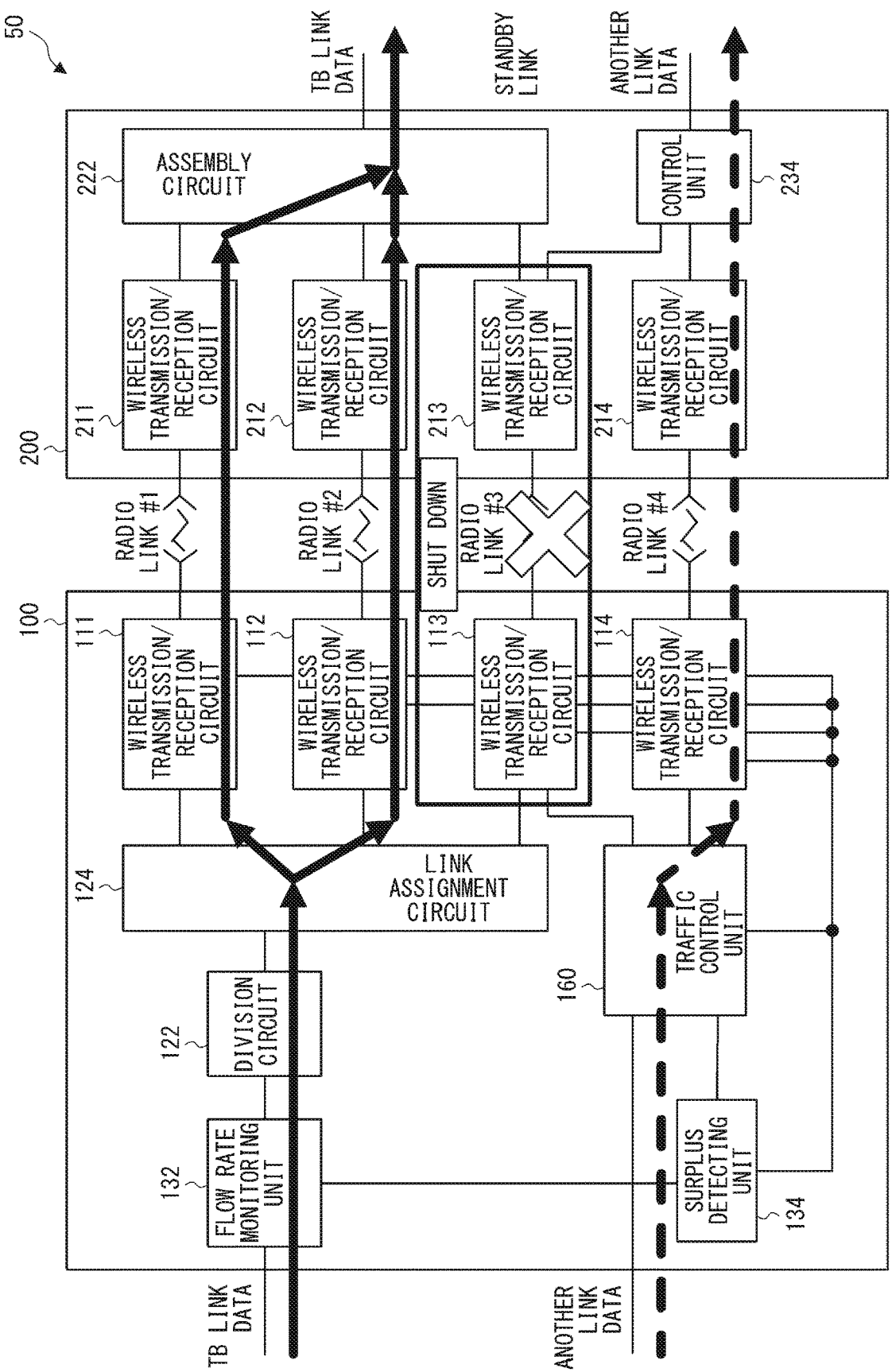
FIG. 12 is view schematically illustrating transmission of the traffic bonding link data and the another link data in the wireless communication system according to the third exemplary embodiment.

FIG. 12 is view schematically illustrating transmission of the traffic bonding link data and the another link data in the wireless communication system 50 according to the third exemplary embodiment. When radio bands secured by traffic bonding have a surplus band equal to or more than a radio band of one radio link (radio link #3) relative to a traffic flow rate of the traffic bonding link data, the radio link #3 is shut down. That is, a traffic of the traffic bonding link data is transmitted by using radio links #1 to and #2. In addition, a traffic of the another link data is transmitted via the radio link #4 which is a link different from the traffic bonding link.

Figure 13:
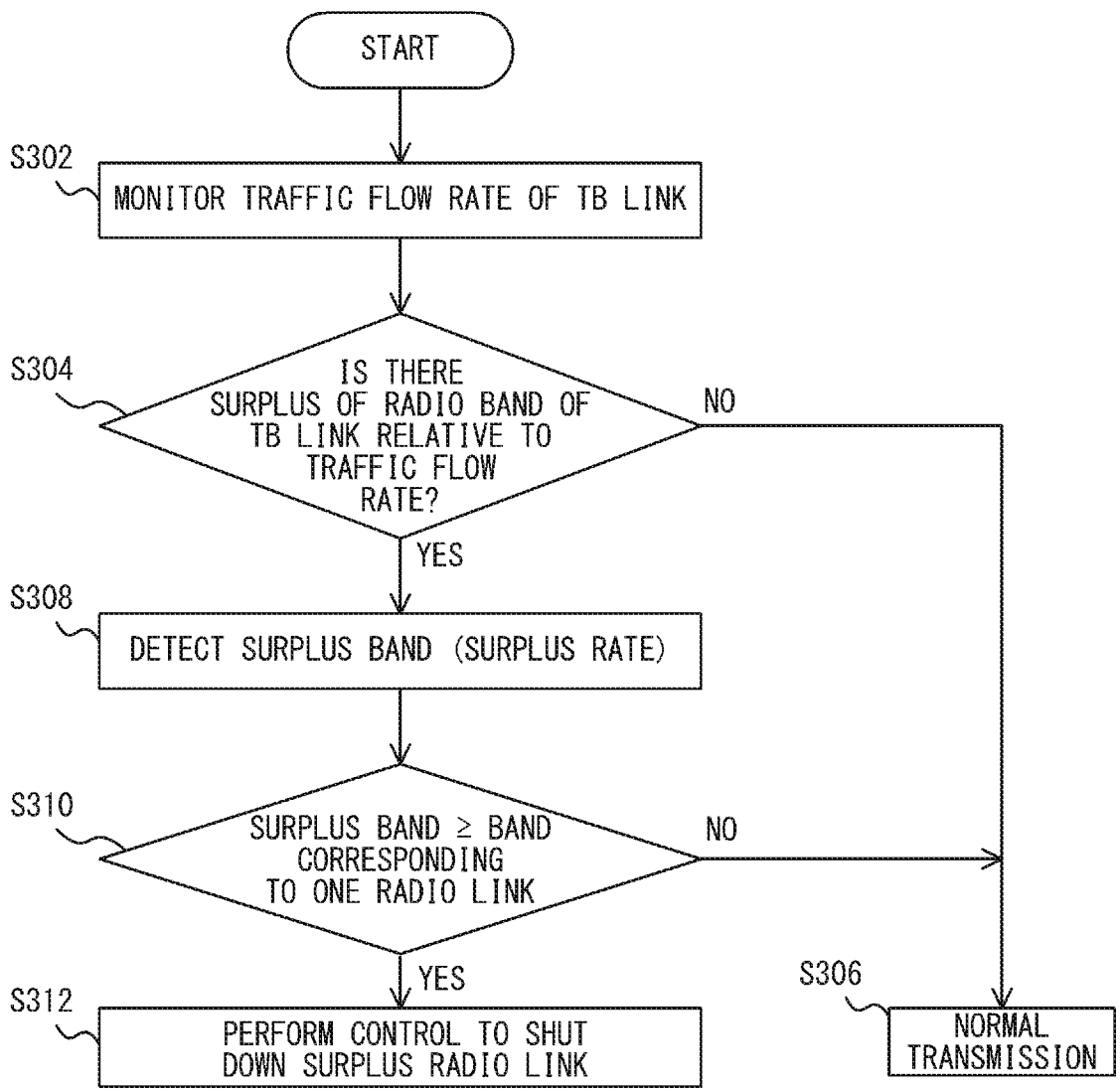
FIG. 13 is a flowchart illustrating a wireless communication method performed by the wireless communication apparatus according to the third exemplary embodiment.

FIG. 13 is a flowchart illustrating a wireless communication method performed by the wireless communication apparatus 100 according to the third exemplary embodiment. Similar to processing in S202, a flow rate monitoring unit 132 of the wireless communication apparatus 100 monitors the traffic flow rate of the traffic bonding link (step S302). Similar to processing in S204, a surplus detecting unit 134 of the wireless communication apparatus 100 decides whether or not there is a surplus of the radio bands of the traffic bonding link relative to the traffic flow rate (step S304). When it is decided that there is no surplus band (NO in S304), the wireless communication apparatus 100 performs normal transmission as illustrated in FIG. 5 (step S306). On the other hand, when it is decided that there is the surplus band (YES in S304), the surplus detecting unit 134 detects the surplus band of the traffic bonding link similar to processing in S208 (step S308).

The wireless communication apparatus 100 decides whether or not the detected surplus band is the radio band of the one radio link or more (step S310). More specifically, a surplus band processing unit 162 decides whether or not the surplus band is, for example, the radio band of the radio link #3 or more. When it is decided that the surplus band is less than the radio band of the one radio link (NO in S310), the wireless communication apparatus 100 performs the normal transmission as illustrated in FIG. 5 (step S306).

On the other hand, when it is decided that the surplus band is the radio band of the one radio link or more (YES in S310), the wireless communication apparatus 100 performs control to shut down the surplus radio link (step S312). More specifically, the link control unit 166 outputs a shut-down control signal to the wireless transmission/reception circuit 113. Further, the link control unit 166 outputs the shut-down control signal to the wireless transmission/reception circuit 114 to transmit the shut-down control signal to the reception side wireless communication apparatus 200. Thus, the link control unit 166 performs control to shut down the surplus radio link #3.

As described above, according to the third exemplary embodiment, the surplus radio link is shut down. Consequently, the wireless transmission/reception circuit associated with the surplus radio link is powered off. Consequently, it is possible to save power.

Fourth Exemplary Embodiment

Next, the fourth exemplary embodiment will be described. The fourth exemplary embodiment differs from the other exemplary embodiments in transmitting data via a plurality of traffic bonding links.

Figure 14:
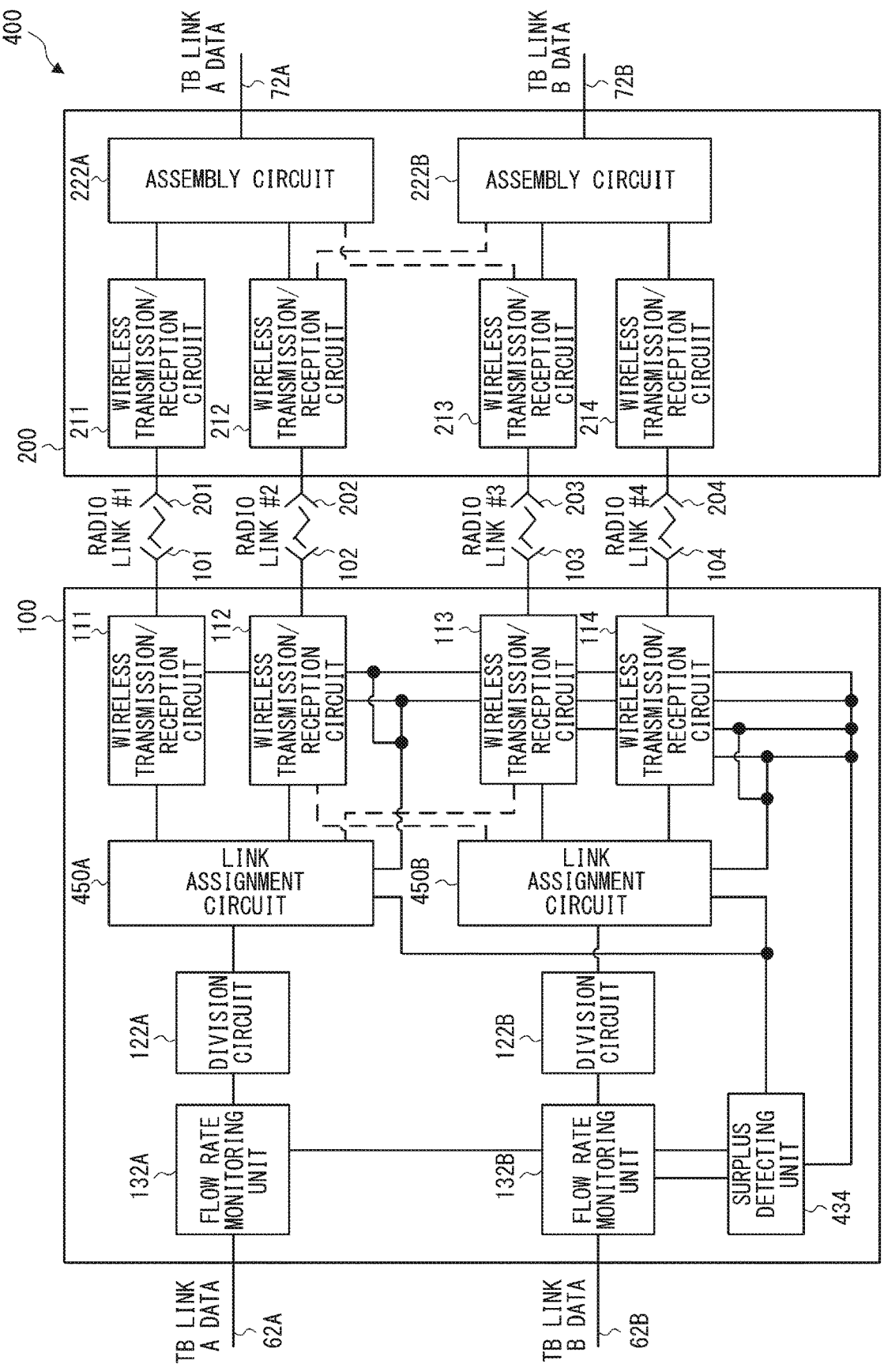
FIG. 14 is a view illustrating a wireless communication system according to the fourth exemplary embodiment.

FIG. 14 is a view illustrating a wireless communication system 400 according to the fourth exemplary embodiment. The wireless communication system 400 includes a transmission side wireless communication apparatus 100 (first wireless communication apparatus) and a reception side wireless communication apparatus 200 (second wireless communication apparatus). The wireless communication apparatus 100 and the wireless communication apparatus 200 are connected to be able to perform wireless communication with each other via four of a radio link #1 to a radio link #4.

In the fourth exemplary embodiment, the radio links #1 and #2 are radio links of first traffic bonding. That is, in the fourth exemplary embodiment, a plurality of the radio links #1 and #2 are bundled to configure a traffic bonding link A (TB link A) which is a first virtual circuit. Further, the radio links #3 and #4 are radio links of second traffic bonding. That is, in the fourth exemplary embodiment, a plurality of the radio links #3 and #4 are bundled to configure a traffic bonding link B (TB link B) which is a second virtual circuit. Further, traffic bonding link A data (TB link A data) is data (traffic A; first traffic) transmitted via the traffic bonding link A. Further, traffic bonding link B data (TB link B data) is data (traffic B; second traffic) transmitted via the traffic bonding link B.

The wireless communication apparatus 100 includes wireless transmission/reception circuits 111, 112, 113, 114, a flow rate monitoring unit 132A, a division circuit 122A, a link assignment circuit 450A, a flow rate monitoring unit 132B, a division circuit 122B, a link assignment circuit 450B and a surplus detecting unit 434. In addition, the wireless transmission/reception circuits 111, 112, 113 and 114 are substantially the same as those in the first exemplary embodiment, and therefore will not be described. Further, the flow rate monitoring unit 132A, the division circuit 122A, the link assignment circuit 450A, the flow rate monitoring unit 132B, the division circuit 122B, the link assignment circuit 450A and the surplus detecting unit 434 are configured as electronic circuits composed of a plurality of electronic elements. In addition, as described below, the link assignment circuit 450A and the link assignment circuit 450B function as control means for controlling a link of a surplus radio band when there is a surplus of radio bands of a virtual circuit relative to a traffic flow rate.

The flow rate monitoring unit 132A, the division circuit 122A, the link assignment circuit 450A and the wireless transmission/reception circuits 111 and 112 are used for a traffic A of the traffic bonding link A data. On the other hand, the flow rate monitoring unit 132B, the division circuit 122B, the link assignment circuit 450B and the wireless transmission/reception circuits 113 and 114 are used for a traffic B of the traffic bonding link B data.

The division circuit 122A is electrically connected with the link assignment circuit 450A. The division circuit 122A receives the traffic bonding link A data transmitted via a data circuit 62A. Further, the link assignment circuit 450A is electrically connected with the wireless transmission/reception circuits 111 and 112. In addition, the link assignment circuit 450A is electrically connected with the wireless transmission/reception circuit 113, too. The flow rate monitoring unit 132A is arranged between the division circuit 122A and the data circuit 62A.

The division circuit 122B is electrically connected with the link assignment circuit 450B. The division circuit 122B receives the traffic bonding link B data transmitted via a data circuit 62B. Further, the link assignment circuit 450B is electrically connected with the wireless transmission/reception circuits 113 and 114. In addition, the link assignment circuit 450B is electrically connected with the wireless transmission/reception circuit 112, too. The flow rate monitoring unit 132B is arranged between the division circuit 122B and the data circuit 62B.

The surplus detecting unit 434 is electrically connected with the flow rate monitoring unit 132A and the flow rate monitoring unit 132B. Further, the surplus detecting unit 434 is electrically connected with the link assignment circuit 450A and the link assignment circuit 450B. Furthermore, the surplus detecting unit 434 is electrically connected with the wireless transmission/reception circuits 111, 112, 113 and 114.

The wireless communication apparatus 200 includes wireless transmission/reception circuits 211, 212, 213 and 214, an assembly circuit 222A and an assembly circuit 222B. In addition, the wireless transmission/reception circuits 221, 212, 213 and 214 are substantially the same as those of the first exemplary embodiment, and therefore will not be described. Further, the assembly circuit 222A and the assembly circuit 222B are configured as electronic circuits composed of a plurality of electronic elements. The wireless transmission/reception circuits 211 and 212 and the assembly circuit 222A are used for a traffic of the traffic bonding link A data. On the other hand, the wireless transmission/reception circuits 213 and 214 and the assembly circuit 222B are used for a traffic of the traffic bonding link B data.

The assembly circuit 222A is connected with a data circuit 72A to transmit the traffic bonding link A data. Further, the assembly circuit 222A is electrically connected with the wireless transmission/reception circuits 211 and 212. On the other hand, the assembly circuit 222B is connected with a data circuit 72B to transmit the traffic bonding link B data. Further, the assembly circuit 222B is electrically connected with the wireless transmission/reception circuits 213 and 214.

Similar to a division circuit 122, the division circuit 122A divides into a plurality of data portions the traffic bonding link A data which is a traffic complying with, for example, the Ethernet. The division circuit 122A outputs a plurality of data portions to the link assignment circuit 450A. Similar to the division circuit 122, the division circuit 122B divides into a plurality of data portions the traffic bonding link B data which is a traffic complying with, for example, the Ethernet. The division circuit 122B outputs a plurality of data portions to the link assignment circuit 450B.

The flow rate monitoring unit 132A monitors the traffic flow rate A (first traffic flow rate) of the traffic bonding link A data. Further, the flow rate monitoring unit 132A outputs actual rate information A indicating the traffic flow rate A (actual rate A) to the surplus detecting unit 434. In addition, the flow rate monitoring unit 132A outputs the inflow traffic (traffic bonding link A data) to the subsequent division circuit 122A.

The flow rate monitoring unit 132B monitors the traffic flow rate B (second traffic flow rate) of the traffic bonding link B data. Further, the flow rate monitoring unit 132B outputs actual rate information B indicating the traffic flow rate B (actual rate B) to the surplus detecting unit 434. In addition, the flow rate monitoring unit 132B outputs the inflow traffic (traffic bonding link B data) to the subsequent division circuit 122B.

The surplus detecting unit 434 accepts the actual rate information A from the flow rate monitoring unit 132A, and accepts the actual rate information B from the flow rate monitoring unit 132B. Further, the surplus detecting unit 434 obtains link rate information of the radio links #1 to #4 from the wireless transmission/reception circuits 111, 112, 113 and 114, respectively.

The surplus detecting unit 434 calculates a total (link rate total A) of link rates A of the radio links #1 and #2 used for the traffic bonding link A. Further, the surplus detecting unit 434 compares the actual rate A (traffic flow rate A) with the link rate total A of the radio links #1 and #2 (a radio band of a first virtual circuit). When the link rate total A of the radio links #1 and #2 is higher than the actual rate A, the surplus detecting unit 434 decides that there is a surplus band in the first virtual circuit (traffic bonding link A).

In this case, the surplus detecting unit 434 detects a surplus band A (surplus rate A) of the traffic bonding link A. More specifically, the surplus detecting unit 434 subtracts the actual rate A from the link rate total A of the radio links #1 and #2. This subtraction result (difference) corresponds to the surplus band A. The surplus detecting unit 434 outputs surplus rate information A indicating the surplus band A (surplus rate A) to the link assignment circuit 450B.

The surplus detecting unit 434 calculates a total (link rate total B) of link rates B of the radio links #3 and #4 used for the traffic bonding link B. Further, the surplus detecting unit 434 compares the actual rate B (traffic flow rate B) with the link rate total B of the radio links #3 and #4 (a radio band of a second virtual circuit). When the link rate total B of the radio links #3 and #4 is higher than the actual rate B, the surplus detecting unit 434 decides that there is a surplus band in the second virtual circuit (traffic bonding link B).

In this case, the surplus detecting unit 434 detects a surplus band B (surplus rate B) of the traffic bonding link B. More specifically, the surplus detecting unit 434 subtracts the actual rate B from the link rate total B of the radio links #3 and #4. This subtraction result (difference) corresponds to the surplus band B. The surplus detecting unit 434 outputs surplus rate information B indicating the surplus band B (surplus rate B) to the link assignment circuit 450A.

Figure 15:
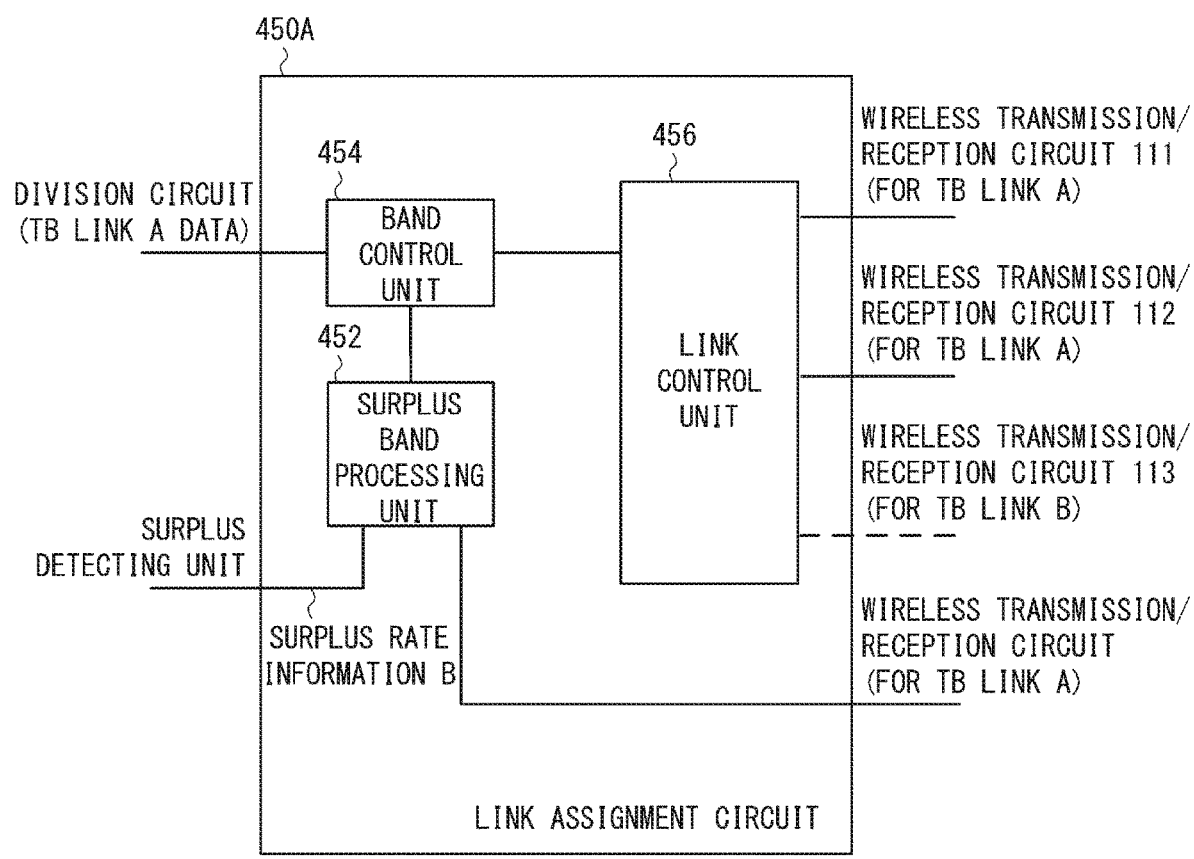
FIG. 15 is a view illustrating a configuration of the link assignment circuit according to the fourth exemplary embodiment.

FIG. 15 is a view illustrating a configuration of the link assignment circuit 450A according to the fourth exemplary embodiment. The link assignment circuit 450A includes a surplus band processing unit 452, a band control unit 454 and a link control unit 456. The link assignment circuit 450A accepts a plurality of data portions of the traffic bonding link A data output from the division circuit 122A. Further, the link assignment circuit 450A obtains the surplus rate information B of the traffic bonding link B from the surplus detecting unit 434.

The surplus band processing unit 452 accepts the surplus rate information B output from the surplus detecting unit 434. Further, the surplus band processing unit 452 obtains transmission rate information (link rate information) indicating the radio bands of the radio links #1 and #2 from the wireless transmission/reception circuits 111 and 112 used for the traffic bonding link A, respectively. The surplus band processing unit 452 calculates a total of the surplus rate B and the radio bands (link rates) of the radio links #1 and #2, and generates band control information A indicating a total transmission rate. This band control information A indicates a radio band which can be used to transmit the traffic bonding link A data. The surplus band processing unit 452 outputs the generated band control information A to the band control unit 454.

The band control unit 454 accepts a plurality of data portions of the traffic bonding link A data output from the division circuit 122A. Further, the band control unit 454 performs band control on a main signal (a plurality of data portions of the traffic bonding link A data) according to the band control information A. Furthermore, the band control unit 454 outputs the main signal subjected to the band control to the link control unit 456.

The link control unit 456 has functions of a link assignment circuit 124 and a link control unit 156 according to the first exemplary embodiment. The link control unit 456 assigns a plurality of data portions to the radio links #1 and #2. In this case, the link control unit 456 assigns to the radio link #1 a data portion having a volume corresponding to the radio band of the radio link #1, and outputs this data portion to the wireless transmission/reception circuit 111. Next, the link control unit 456 assigns to the radio link #2 a data portion having a volume corresponding to the radio band of the radio link #2, and outputs this data portion to the wireless transmission/reception circuit 112.

Further, the link control unit 456 assigns the rest of data portions to the radio link #3, and outputs this data portion to the wireless transmission/reception circuit 113. In addition, the radio link #3 is used to transmit the traffic bonding link B data. Hence, the link control unit 456 adds an identifier (identifier A) indicating the traffic bonding link A data to the data portion assigned to the radio link #3 so that the reception side wireless communication apparatus 200 distinguishes between the traffic bonding link A data and the traffic bonding link B data.

In addition, a configuration of the link assignment circuit 450B is substantially the same as the configuration illustrated in FIG. 15, and therefore will not be described. In addition, the configuration of the link assignment circuit 450B corresponds to a configuration where, in the description of the link assignment circuit 450A, symbols "A" are replaced with symbols "B" and the symbols "B" are replaced with the symbols "A". Further, the configuration of the link assignment circuit 450B corresponds to a configuration where the radio links #1, #2 and #3 are replaced with the radio links #4, #3 and #2, respectively, and the wireless transmission/reception circuits 111, 112 and 113 are replaced with the wireless transmission/reception circuits 114, 113 and 112, respectively.

Furthermore, the link control unit 456 of the link assignment circuit 450A assigns the data portions in order of the radio link #1 and the radio link #2. Thus, when the traffic flow rate A is low, and there is a surplus of the radio bands of the traffic bonding link A, the radio link #2 has a surplus band. Meanwhile, the link control unit 456 of the link assignment circuit 450B assigns the data portions in order of the radio link #4 and the radio link #3. Thus, when the traffic flow rate B is low, and there is a surplus of the radio bands of the traffic bonding link B, the radio link #3 has a surplus band.

The wireless transmission/reception circuits 111 and 112 transmit the data portions of the traffic bonding link A data respectively assigned by the link assignment circuit 450A, to the wireless transmission/reception circuits 211 and 212 via the radio links #1 and #2, respectively. In addition, the wireless transmission/reception circuit 112 can accept the data portion of the traffic bonding link B data from the link assignment circuit 450B. Consequently, the wireless transmission/reception circuit 112 can transmit the data portion of the traffic bonding link B data, too, to the wireless transmission/reception circuit 212 via the radio link #2.

The wireless transmission/reception circuits 113 and 114 transmit the data portions of the traffic bonding link B data respectively assigned by the link assignment circuit 450B, to the wireless transmission/reception circuits 213 and 214 via the radio links #3 and #4, respectively. In addition, the wireless transmission/reception circuit 113 can accept the data portion of the traffic bonding link A data from the link assignment circuit 450A. Consequently, the wireless transmission/reception circuit 113 can transmit the data portion of the traffic bonding link A data, too, to the wireless transmission/reception circuit 213 via the radio link #3.

The wireless transmission/reception circuits 211 and 212 output to the assembly circuit 222A the data portions of the traffic bonding link A data received via the radio links #1 and #2, respectively. The assembly circuit 222A assembles a plurality of data portions, and generates (restores) the original traffic bonding link A data. Further, the assembly circuit 222A transmits the restored traffic bonding link A data to the data circuit 72A.

The wireless transmission/reception circuits 213 and 214 output to the assembly circuit 222B the data portions of the traffic bonding link B data received via the radio links #3 and #4, respectively. The assembly circuit 222B assembles a plurality of data portions, and generates (restores) the original traffic bonding link B data. Further, the assembly circuit 222B transmits the restored traffic bonding link B data to the data circuit 72B.

In addition, the wireless transmission/reception circuit 212 can receive the data portions of the traffic bonding link B data from the wireless transmission/reception circuit 112. When the identifier B is added to the received data, the wireless transmission/reception circuit 212 outputs this data to the assembly circuit 222B. The assembly circuit 222B restores the original traffic bonding link B data by using not only the data portions accepted from the wireless transmission/reception circuits 213 and 214, but also the data portions accepted from the wireless transmission/reception circuit 212.

Similarly, the wireless transmission/reception circuit 213 can receive the data portions of the traffic bonding link A data from the wireless transmission/reception circuit 113. When the identifier A is added to the received data, the wireless transmission/reception circuit 213 outputs this data to the assembly circuit 222A. The assembly circuit 222A restores the original traffic bonding link A data by using not only the data portions accepted from the wireless transmission/reception circuits 211 and 212, but also the data portions accepted from the wireless transmission/reception circuit 213.

Next, an operation of the wireless communication apparatus 100 according to the fourth exemplary embodiment will be described by using a specific example.

Figure 16:
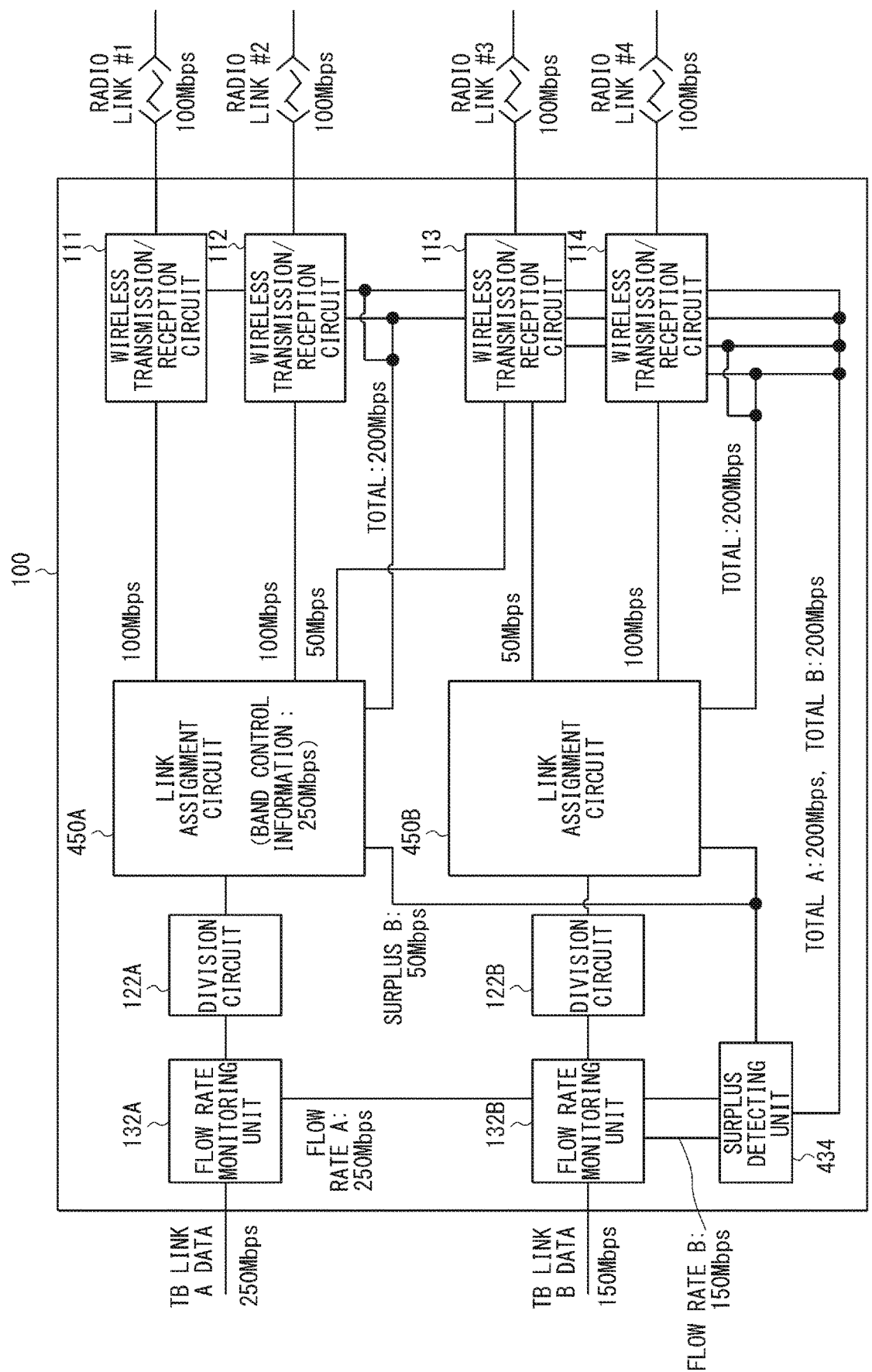
FIG. 16 is a view illustrating the specific example for explaining the operation of the wireless communication apparatus according to the fourth exemplary embodiment.

FIG. 16 is a view illustrating the specific example for explaining the operation of the wireless communication apparatus 100 according to the fourth exemplary embodiment. In the specific example illustrated in FIG. 16, the radio bands of the radio links #1 to #4 are 100 Mbps. Further, the traffic flow rate A (actual rate A) of the traffic bonding link A data is 250 Mbps. Furthermore, the traffic flow rate B (actual rate B) of the traffic bonding link B data is 150 Mbps.

The flow rate monitoring unit 132A outputs the actual rate information A indicating "250 Mbps" as the traffic flow rate A (actual rate A) to the surplus detecting unit 434. Further, the flow rate monitoring unit 132B outputs the actual rate information B indicating "150 Mbps" as the traffic flow rate B (actual rate B) to the surplus detecting unit 434.

The surplus detecting unit 434 accepts link rate information indicating 100 Mbps as the radio bands from the wireless transmission/reception circuits 111, 112, 113 and 114, respectively. The surplus detecting unit 434 calculates the link rate total A as 100+100=200 (Mbps). Further, the surplus detecting unit 434 calculates the link rate total B as 100+100=200 (Mbps). Furthermore, the surplus detecting unit 434 calculates the surplus band B as 200−150=50 (Mbps). The surplus detecting unit 434 outputs the surplus rate information B indicating "50 Mbps" as the surplus band B (surplus rate B) to the link assignment circuit 450A. In addition, the traffic bonding link A has a relationship of actual rate A>link rate total A (250 Mbps>200 Mbps). Therefore, the surplus detecting unit 434 decides that there is no surplus band.

The link assignment circuit 450B assigns to the wireless transmission/reception circuit 114 the data portion corresponding to 100 Mbps which is the radio band of the radio link #4 among the data portions of the traffic bonding link B data. Furthermore, the link assignment circuit 450B assigns to the wireless transmission/reception circuit 113 the data portion corresponding to 50 Mbps which is the rest of the data portions of the traffic bonding link B data.

The surplus band processing unit 452 of the link assignment circuit 450A accepts link rate information indicating 100 Mbps as the radio bands from the wireless transmission/reception circuits 111 and 112. Further, the surplus band processing unit 452 calculates a total of the surplus rate B "50 Mbps" and the link rate total A "200 Mbps" as a transmission rate "250 Mbps". The surplus band processing unit 452 generates the band control information A indicating the transmission rate "250 Mbps". The band control unit 454 of the link assignment circuit 450A performs band control on the traffic bonding link A data at 250 Mbps.

The link control unit 456 of the link assignment circuit 450A outputs to the wireless transmission/reception circuit 111 the data portion corresponding to 100 Mbps which is the radio band of the radio link #1. Further, the link control unit 456 outputs to the wireless transmission/reception circuit 112 the data portion corresponding to 100 Mbps which is the radio band of the radio link #2. Furthermore, the link control unit 456 outputs the rest of data portions to the wireless transmission/reception circuit 113. This rest of data portions correspond to data corresponding to 50 Mbps which is the surplus band.

The wireless transmission/reception circuits 111 and 112 transmit the data portions of the traffic bonding link A data in the radio bands of 100 Mbps. The wireless transmission/reception circuit 113 transmits the data portions of the traffic bonding link B data in the radio band of 50 Mbps, and transmits the data portions of the traffic bonding link A data in the radio band of 50 Mbps. The wireless transmission/reception circuit 114 transmits the data portions of the traffic bonding link B in the radio band of 100 Mbps. In this way, the surplus band (50 Mbps) of the traffic bonding link B (radio links #3 and #4) is used to transmit the traffic bonding link A data.

Figure 17:
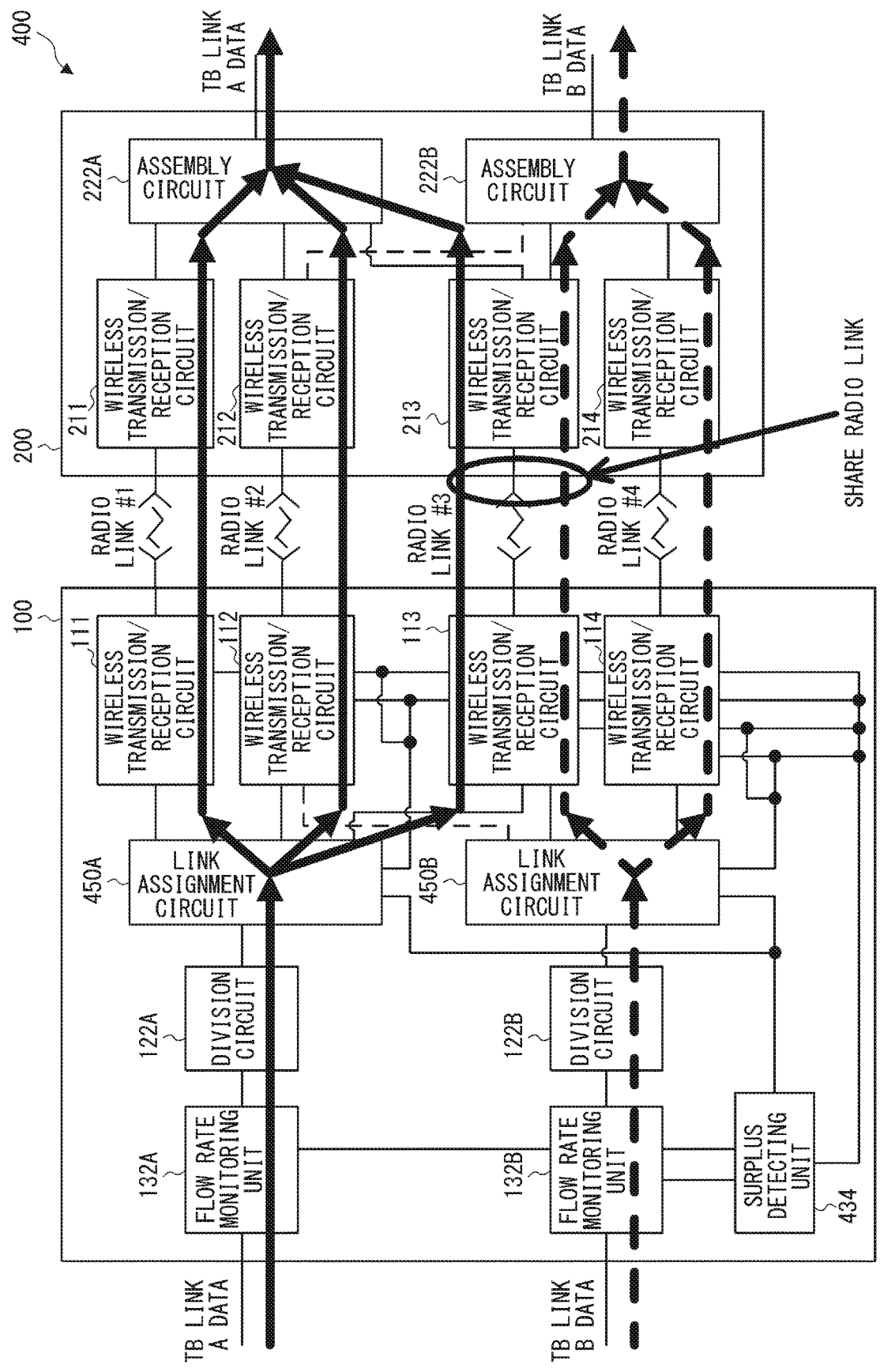
FIG. 17 is a view schematically illustrating transmission of the traffic bonding link data in the wireless communication system according to the fourth exemplary embodiment.

FIG. 17 is a view schematically illustrating transmission of the traffic bonding link data in the wireless communication system 50 according to the fourth exemplary embodiment. Bold solid lines indicate flows of the traffic bonding link A data, and bold broken lines indicate flows of the traffic bonding link B data.

When the traffic flow rate B (actual rate B) of the traffic bonding link B data is lower than the radio band of the traffic bonding link B, there is a surplus band in the radio bands of the traffic bonding link B. Hence, the traffic bonding link A data can be transmitted by using this surplus band, too. That is, as illustrated in FIG. 17, the traffic A of the traffic bonding link A data is transmitted by sharing part of the traffic bonding link B (the radio link #3 in the example in FIG. 17).

Further, when the traffic flow rate A (actual rate A) of the traffic bonding link A data is lower than the radio band of the traffic bonding link A, there is a surplus band in the radio bands of the traffic bonding link A. Hence, the traffic bonding link B data can be transmitted by using this surplus band, too. That is, the traffic B of the traffic bonding link B data is transmitted by sharing part of the traffic bonding link A (the radio link #2).

In addition, when the traffic flow rate B (actual rate B) of the traffic bonding link B data is the radio bands of the traffic bonding link B or more, all radio bands of the radio links #3 and #4 are used for the traffic bonding link B data. That is, there is no surplus band in the radio bands of the traffic bonding link B. Hence, in this case, the traffic A of the traffic bonding link A data is transmitted only via the radio links #1 and #2 which are links different from the traffic bonding link B. Thus, independently transmitting data without sharing radio bands between the traffic bonding link A and the traffic bonding link B is referred to as normal transmission. The same applies to a case where the traffic flow rate A (actual rate A) of the traffic bonding link A data is radio bands of the traffic bonding link A or more.

Figure 18:
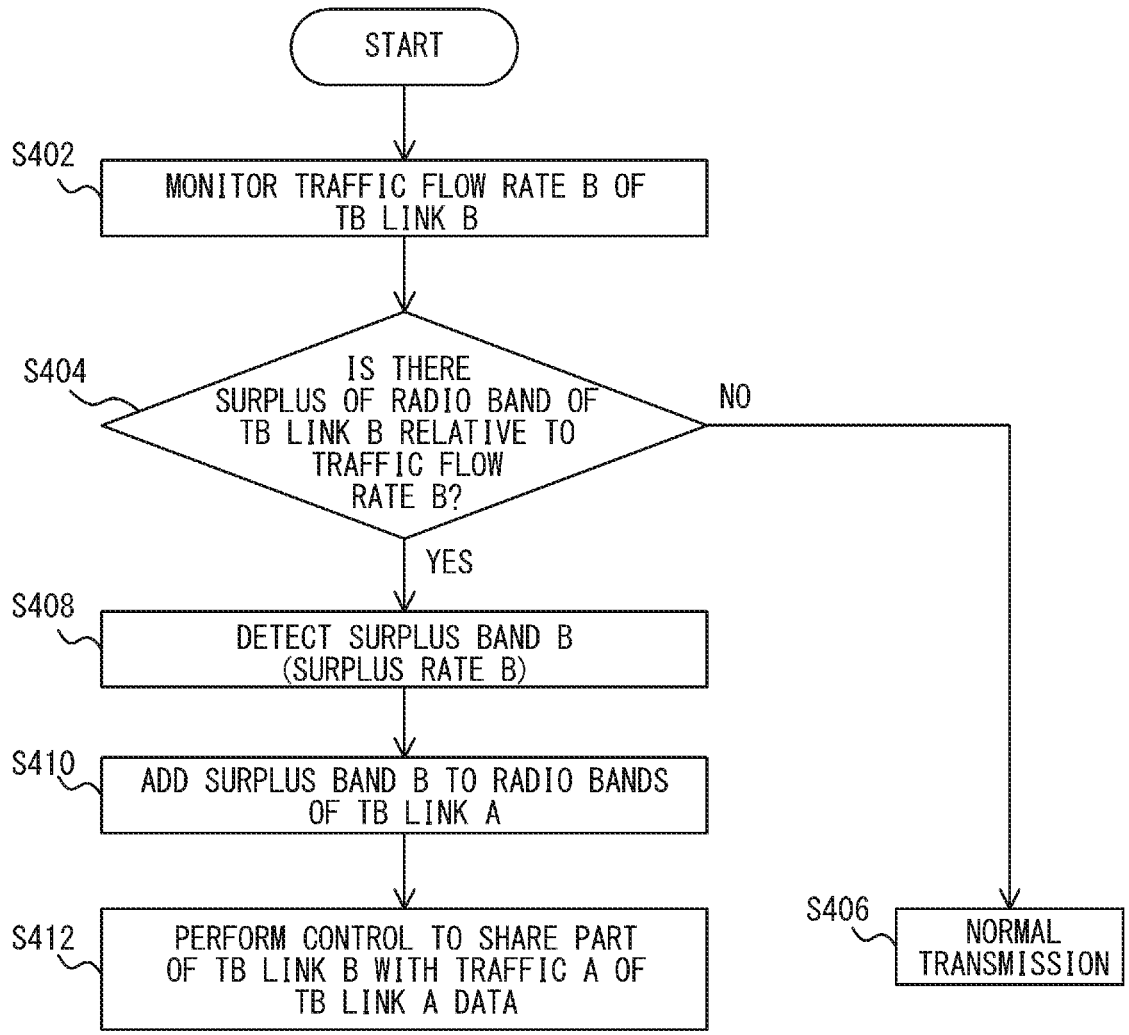
FIG. 18 is a flowchart illustrating a wireless communication method performed by the wireless communication apparatus according to the fourth exemplary embodiment.

FIG. 18 is a flowchart illustrating a wireless communication method performed by the wireless communication apparatus 100 according to the fourth exemplary embodiment. FIG. 18 illustrates a method for monitoring the traffic flow rate B of the traffic bonding link B data, and using a surplus band to transmit the traffic bonding link A data when there is a surplus of the radio bands of the traffic bonding link B. In addition, a method for using a surplus band to transmit the traffic bonding link B data when there is a surplus of the radio bands of the traffic bonding link A has the same processing flow as the flowchart in FIG. 18.

As described above, the flow rate monitoring unit 132B of the wireless communication apparatus 100 monitors the traffic flow rate B of the traffic bonding link B (step S402). As described above, the surplus detecting unit 434 of the wireless communication apparatus 100 decides whether or not there is a surplus of the radio bands of the traffic bonding link B relative to the traffic flow rate B (step S404). When it is decided that there is no surplus band (NO in S404), the wireless communication apparatus 100 performs the normal transmission (step S406). On the other hand, when it is decided that there is the surplus band (YES in S404), the surplus detecting unit 434 detects the surplus band B (surplus rate B) of the traffic bonding link B as described above (step S408).

The surplus band processing unit 452 of the link assignment circuit 450A performs control to add the surplus band B to the radio bands of the traffic bonding link A as described above (step S410). More specifically, the surplus band processing unit 452 calculates a total of the surplus rate B and the radio bands (link rates) of the radio links #1 and #2, and generates the band control information A of the total transmission rate. Further, the band control unit 454 of the link assignment circuit 450A performs band control on the main signal (traffic bonding link A data) according to the band control information A. In this way, the link assignment circuit 450A performs control to add a surplus band to the radio bands of the traffic bonding link A.

The link control unit 456 of the link assignment circuit 450A performs control to share part of the traffic bonding link B with the traffic of the traffic bonding link A data (step S412). More specifically, the link control unit 456 outputs data of the traffic bonding link A data corresponding to the surplus band, to the wireless transmission/reception circuit 113 which is used as the traffic bonding link B. In this way, the link assignment circuit 450A performs control to share part (corresponding to the surplus band B) of the traffic bonding link B with the traffic of the traffic bonding link A data.

Similar to the first exemplary embodiment, according to the fourth exemplary embodiment, too, the wireless communication apparatus 100 can detect a surplus band of at least one of the traffic bonding link A and the traffic bonding link B. Consequently, it is possible to effectively use the surplus band of the traffic bonding link.

Further, similar to the first exemplary embodiment, according to the fourth exemplary embodiment, the surplus band of the one traffic bonding link can be shared with a traffic of the other traffic bonding link data. Consequently, even when a traffic flow rate is high compared to radio bands of the traffic bonding link, it is possible to suppress transmission delay of the traffic. That is, according to the fourth exemplary embodiment, it is possible to effectively use the surplus band of the traffic bonding link.

Modified Example

In addition, the present invention is not limited to the above exemplary embodiment, and can be optionally modified without departing from the scope of the invention. For example, each of a plurality of the above exemplary embodiments is applicable to each other. For example, the first exemplary embodiment may be applied to the second exemplary embodiment. In this case, when a surplus band is smaller than a radio band of one radio link, radio bands of a traffic bonding link may be shared with a traffic of another link data. When the surplus band becomes equal to or more than the radio band of the one radio link, this radio link may be used as a standby link. That is, when a decision result in S210 is NO in FIG. 11, a wireless communication apparatus 100 may perform processing in S110 and S112 illustrated in FIG. 7.

Further, in the above exemplary embodiments, the number of a plurality of radio links is four (a radio link #1 to a radio link #4). However, the number of radio links may be any number as long as the number of radio links is plural. Similarly, the number of wireless transmission/reception circuits can be also determined arbitrarily according to the number of radio links. Further, the number of radio links which configure a traffic bonding link can be also optionally determined.

Further, the wireless communication apparatus 100 may include one or more components of a wireless communication apparatus 200. Similarly, the wireless communication apparatus 200 may include one or more components of the wireless communication apparatus 100. In this case, the wireless communication apparatus 200 may transmit data to the wireless communication apparatus 100. Further, in this case, functions of wireless transmission/reception circuits 211, 212, 213 and 214 may be substantially the same as functions of wireless transmission/reception circuits 111, 112, 113 and 114.

Furthermore, two or more components may be physically integrated. For example, a flow rate monitoring unit 132 may be physically integrated with a surplus detecting unit 134. Further, a flow rate monitoring unit 132A and a flow rate monitoring unit 132B may be physically integrated with each other. Furthermore, a plurality of functions of one component may be realized by physically separate components. For example, components that constitute the traffic control unit 150 may be physically separate. Further, the wireless transmission/reception circuits 111, 112, 113 and 114 may be arranged physically apart from the wireless communication apparatus 100.

Furthermore, in the above first exemplary embodiment, a link assignment circuit 124 assigns data portions in order from a radio link of a smaller link number. However, the first exemplary embodiment is not limited to such a configuration, and data may be assigned to a plurality of radio links in arbitrary order. Still further, the order that the link assignment circuit 124 assigns the data portions to the radio links may be dynamically determined. For example, the order for dynamically assigning the data portions may be determined according to stability of radio links, transmission capacities of the radio links, and an average of modulation multi-values (M-ary values) of the radio links. In this case, for example, the data portions may be assigned in order from a radio link of a higher transmission capacity.

Further, according to the above exemplary embodiments, a link assignment circuit assigns data portions unevenly to one of a plurality of radio links. However, the first to fourth exemplary embodiments in particular are not limited to such a configuration. According to the first to fourth exemplary embodiments, the link assignment circuit may assign a plurality of data portions evenly to the radio links #1 to #3. For example, in the first exemplary embodiment, the radio link #2 and the radio link #3 may have surplus bands. In this case, a traffic control unit 150 may perform control to transmit a traffic of another link data via at least one of the radio link #2 and the radio link #3.

Further, in the above-mentioned exemplary embodiments, the present invention has been explained as a hardware configuration, however the present invention is not limited thereto. In the present invention, the processing of each of the circuits in the wireless communication apparatus can be realized by causing a CPU (Central Processing Unit) to execute a computer program.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described by, but not limited to, the following supplementary notes.

(Supplementary Note 1)

A wireless communication apparatus comprising:

flow rate monitoring means for monitoring a traffic flow rate of a first link configured by virtually bundling a plurality of radio links; and detecting means for comparing the monitored traffic flow rate with a radio band of the first link, and detecting a surplus of radio bands of the first link relative to the traffic flow rate.

(Supplementary Note 2)

The wireless communication apparatus according to Supplementary note 1, further comprising control means for controlling a link of the surplus radio band when there is the surplus of radio bands of the first link relative to the traffic flow rate.

(Supplementary Note 3)

The wireless communication apparatus according to Supplementary note 2, wherein the wireless communication apparatus transmits first traffic transmitted via the first link, and second traffic transmitted via another link different from the first link, and the control means performs control to share part of the first link with the second traffic.

(Supplementary Note 4)

The wireless communication apparatus according to Supplementary note 2, wherein, when the surplus of radio bands is equal to or more than radio bands of the first radio link of the plurality of radio links, the control means performs control to use the first radio link as a standby link.

(Supplementary Note 5)

The wireless communication apparatus according to Supplementary note 2, wherein, when the surplus of radio bands is equal to or more than radio bands of the first radio link of the plurality of radio links, the control means performs control to shut down the first radio link.

(Supplementary Note 6)

The wireless communication apparatus according to Supplementary note 2, wherein the wireless communication apparatus transmits first traffic and second traffic, the first traffic being transmitted via one first link of a plurality of the first links, and the second traffic being transmitted via another first link different from the one first link, the flow rate monitoring means monitors a first traffic flow rate of the one first link, and a second traffic flow rate of the another first link, the detecting means detects a surplus of radio bands of the one first link relative to the first traffic flow rate, and detects a surplus of radio bands of the another first link relative to the second traffic flow rate, and the control means performs control to share part of the one first link with the second traffic when there is the surplus of radio bands of the one first link relative to the first traffic flow rate, and performs control to share part of the another first link with the first traffic when there is the surplus of radio bands of the another first link relative to the second traffic flow rate.

(Supplementary Note 7)

A wireless communication system comprising:

a first wireless communication apparatus;

a second wireless communication apparatus that receives data from the first wireless communication apparatus via a plurality of radio links, wherein the first wireless communication apparatus includes flow rate monitoring means for monitoring a traffic flow rate of a first link configured by virtually bundling a plurality of radio links, and detecting means for comparing the monitored traffic flow rate with a radio band of the first link, and detecting a surplus of radio bands of the first link relative to the traffic flow rate.

(Supplementary Note 8)

A wireless communication method comprising:

monitoring a traffic flow rate of a first link configured by virtually bundling a plurality of radio links; and comparing the monitored traffic flow rate with a radio band of the first link, and detecting a surplus of radio bands of the first link relative to the traffic flow rate.

(Supplementary Note 9)

The wireless communication method according to Supplementary note 8, further comprising controlling a link of the surplus radio band when there is the surplus of radio bands of the first link relative to the traffic flow rate.

(Supplementary Note 10)

The wireless communication method according to Supplementary note 9, further comprising:

transmitting first traffic transmitted via the first link, and second traffic transmitted via another link different from the first link, and performing control to share part of the first link with the second traffic.

(Supplementary Note 11)

The wireless communication method according to Supplementary note 9, further comprising performing control to use the first radio link as a standby link when the surplus of radio bands is equal to or more than radio bands of the first radio link of the plurality of radio links.

(Supplementary Note 12)

The wireless communication method according to Supplementary note 9, further comprising performing control to shut down the first radio link when the surplus of radio bands is equal to or more than radio bands of the first radio link of the plurality of radio links.

(Supplementary Note 13)

The wireless communication method according to Supplementary note 9, further comprising:

transmitting first traffic and second traffic, the first traffic being transmitted via one first link of a plurality of the first links, and the second traffic being transmitted via another first link different from the one first link;

monitoring a first traffic flow rate of the one first link;

monitoring a second traffic flow rate of the another first link;

detecting a surplus of radio bands of the one first link relative to the first traffic flow rate;

detecting a surplus of radio bands of the another first link relative to the second traffic flow rate;

performing control to share part of the one first link with the second traffic when there is the surplus of radio bands of the one first link relative to the first traffic flow rate; and performing control to share part of the another first link with the first traffic when there is the surplus of radio bands of the another first link relative to the second traffic flow rate.

Although the present invention has been explained with reference to the exemplary embodiments, the present invention is not limited by above. Various modifications, obvious to those in the art, can be made to the configurations and details of the present invention within the scope of the invention.

The present application claims priority rights of and is based on Japanese Patent Application No. 2015-208756 filed on Oct. 23, 2015 in the Japanese Patent Office, the entire contents of which are hereby incorporated by reference.

REFERENCE SIGNS LIST

1 WIRELESS COMMUNICATION APPARATUS
2 FLOW RATE MONITORING UNIT
4 DETECTING UNIT
50, 400 WIRELESS COMMUNICATION SYSTEM
100, 200 WIRELESS COMMUNICATION APPARATUS
111, 112, 113, 114 WIRELESS TRANSMISSION/RECEPTION CIRCUIT
122, 122A, 122B DIVISION CIRCUIT
124, 450A, 450B LINK ASSIGNMENT CIRCUIT
132, 132A, 132B FLOW RATE MONITORING UNIT
134, 434 SURPLUS DETECTING UNIT
150, 160 TRAFFIC CONTROL UNIT
152, 162, 452 SURPLUS BAND PROCESSING UNIT
154, 164, 454 BAND CONTROL UNIT
156, 166, 456 LINK CONTROL UNIT
211, 212, 213, 214 WIRELESS TRANSMISSION/RECEPTION CIRCUIT
222, 222A, 222B ASSEMBLY CIRCUIT
224, 234 CONTROL UNIT

What is claimed is:

1. A wireless communication apparatus comprising:
a flow rate monitoring circuit configured to monitor a traffic flow rate of a first link as a whole, the first link being a traffic bonding link and configured by virtually bundling a plurality of radio links;
a link assignment circuit configured
to receive a plurality of data portions for the first link, and
to assign the plurality of data portions to the radio links so that a plurality of data portions are assigned unevenly to the radio links and a surplus radio band occurs in the first link to which the data portions are not assigned;
a detecting circuit configured to compare the monitored traffic flow rate with a radio band of the first link as a whole, and detect a surplus of radio bands of the first link relative to the traffic flow rate; and
a control circuit configured to control a link of the surplus radio band so that the surplus of radio bands of the first link is used for use different from the communication using the first link when there is the surplus of radio bands of the first link relative to the traffic flow rate.

2. The wireless communication apparatus according to claim 1, wherein
the wireless communication apparatus transmits first traffic transmitted via the first link, and second traffic transmitted via another link different from the first link, and
the control circuit performs control to share part of the first link with the second traffic.

3. The wireless communication apparatus according to claim 1, wherein, when the surplus of radio bands is equal to or more than radio bands of the first radio link of the plurality of radio links, the control circuit performs control to use the first radio link as a standby link.

4. The wireless communication apparatus according to claim 1, wherein, when the surplus of radio bands is equal to or more than radio bands of the first radio link of the plurality of radio links, the control circuit performs control to shut down the first radio link.

5. The wireless communication apparatus according to claim 1, wherein
the wireless communication apparatus transmits first traffic and second traffic, the first traffic being transmitted via one first link of a plurality of the first links, and the second traffic being transmitted via another first link different from the one first link,
the flow rate monitoring circuit monitors a first traffic flow rate of the one first link, and a second traffic flow rate of the another first link,
the detecting circuit detects a surplus of radio bands of the one first link relative to the first traffic flow rate, and detects a surplus of radio bands of the another first link relative to the second traffic flow rate, and
the control circuit performs control to share part of the one first link with the second traffic when there is the surplus of radio bands of the one first link relative to the first traffic flow rate, and performs control to share part of the another first link with the first traffic when there is the surplus of radio bands of the another first link relative to the second traffic flow rate.

6. A wireless communication system comprising:
a first wireless communication apparatus;
a second wireless communication apparatus that receives data from the first wireless communication apparatus via a plurality of radio links,
wherein the first wireless communication apparatus includes
a flow rate monitoring circuit configured to monitor a traffic flow rate of a whole of a first link being a traffic bonding link and configured by virtually bundling a plurality of radio links;
a link assignment circuit configured to receive a plurality of data portions for the first link and to assign the plurality of data portions to the radio links so that a plurality of data portions are assigned unevenly to the radio links and a surplus radio band occurs in the first link to which the data portions are not assigned;
a detecting circuit configured to compare the monitored traffic flow rate with a radio band of the whole of the first link, and detect a surplus of radio bands of the first link relative to the traffic flow rate; and
a control circuit configured to control a link of the surplus radio band so that the surplus of radio bands of the first link is used for use different from the communication using the first link when there is the surplus of radio bands of the first link relative to the traffic flow rate.

7. A wireless communication method comprising:
monitoring a traffic flow rate of a first link as a whole, the first link being a traffic bonding link and configured by virtually bundling a plurality of radio links;
receiving a plurality of data portions for the first link and to assign the plurality of data portions to the radio links so that a plurality of data portions are assigned unevenly to the radio links and a surplus radio band occurs in the first link to which the data portions are not assigned;
comparing the monitored traffic flow rate with a radio band of the first link as a whole, and detecting a surplus of radio bands of the first link relative to the traffic flow rate; and
controlling a link of the surplus radio band so that the surplus of radio bands of the first link is used for use different from the communication using the first link when there is the surplus of radio bands of the first link relative to the traffic flow rate.

8. The wireless communication method according to claim 7, further comprising:
transmitting first traffic transmitted via the first link, and second traffic transmitted via another link different from the first link, and performing control to share part of the first link with the second traffic.

9. The wireless communication method according to claim 7, further comprising performing control to use the first radio link as a standby link when the surplus of radio bands is equal to or more than radio bands of the first radio link of the plurality of radio links.

10. The wireless communication method according to claim 7, further comprising performing control to shut down the first radio link when the surplus of radio bands is equal to or more than radio bands of the first radio link of the plurality of radio links.

11. The wireless communication method according to claim 7, further comprising:

transmitting first traffic and second traffic, the first traffic being transmitted via one first link of a plurality of the first links, and the second traffic being transmitted via another first link different from the one first link;

monitoring a first traffic flow rate of the one first link;

monitoring a second traffic flow rate of the another first link;

detecting a surplus of radio bands of the one first link relative to the first traffic flow rate;

detecting a surplus of radio bands of the another first link relative to the second traffic flow rate;

performing control to share part of the one first link with the second traffic when there is the surplus of radio bands of the one first link relative to the first traffic flow rate; and performing control to share part of the another first link with the first traffic when there is the surplus of radio bands of the another first link relative to the second traffic flow rate.

\* \* \* \* \*